(12) United States Patent
Wait et al.

(10) Patent No.: US 8,010,391 B2
(45) Date of Patent: *Aug. 30, 2011

(54) CLAIMS PROCESSING HIERARCHY FOR INSURED

(75) Inventors: Julian F. Wait, Austin, TX (US); Jess V. Knifton, Austin, TX (US)

(73) Assignee: Computer Sciences Corporation, El Segundo, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 11/824,599

(22) Filed: Jun. 29, 2007

(65) Prior Publication Data

US 2009/0006140 A1      Jan. 1, 2009

(51) Int. Cl.
*G06F 40/00* (2006.01)
(52) U.S. Cl. .......................................................... 705/4
(58) Field of Classification Search .................. 705/2–4, 705/35–45
See application file for complete search history.

(56) References Cited

U.S. PATENT DOCUMENTS

| | | | |
|---|---|---|---|
| 4,525,780 A | 6/1985 | Bratt et al. |
| 4,553,206 A | 11/1985 | Smutek et al. |
| 4,648,062 A | 3/1987 | Johnson et al. |
| 4,812,966 A | 3/1989 | Takagi et al. |
| 4,831,526 A | 5/1989 | Luchs et al. |
| 4,837,693 A | 6/1989 | Schotz |
| 4,839,822 A | 6/1989 | Dormond et al. |
| 4,878,167 A | 10/1989 | Kapulka et al. |
| 4,964,077 A | 10/1990 | Eisen et al. |
| 4,975,840 A | 12/1990 | DeTore et al. |
| 4,987,538 A | 1/1991 | Johnson et al. |
| 4,992,972 A | 2/1991 | Brooks et al. |
| 5,008,853 A | 4/1991 | Bly et al. |
| 5,093,911 A | 3/1992 | Parks et al. |
| 5,099,422 A | 3/1992 | Foresman et al. |
| 5,155,806 A | 10/1992 | Hoeber et al. |

(Continued)

FOREIGN PATENT DOCUMENTS

EP      0 280 773      9/1988

(Continued)

OTHER PUBLICATIONS

Sage, Bobbie. When You Need to File a Life Insurance Policy Claim. Jul. 9, 2004. http://personalinsure.about.com/cs/lifeinsurance/a/aa051204a.htm.*

(Continued)

*Primary Examiner* — Kambiz Abdi
*Assistant Examiner* — Stephanie Ziegle
(74) *Attorney, Agent, or Firm* — Meyertons, Hood, Kivlin, Kowert & Goetzel, P.C.; Eric B. Meyertons

(57) ABSTRACT

Methods and systems are provided for processing claims. A hierarchy may be created for claims specific to the insured that includes a claim management case level, a policy level, and a coverage level. The claim management case level may include a claim management case node. The policy level may include one or more policy nodes. Each of the policy nodes may relate to an insurance policy covering the insured. The one or more insurance policies covering the insured are associated with the claim management case. The coverage level may include one or more coverage nodes. Each of the coverage nodes may relate to an insurance coverage covering the insured. Each of the insurance coverages may be associated with one of the insurance policies.

16 Claims, 11 Drawing Sheets

U.S. PATENT DOCUMENTS

| | | |
|---|---|---|
| 5,157,768 A | 10/1992 | Hoeber et al. |
| 5,170,464 A | 12/1992 | Hayes et al. |
| 5,191,522 A | 3/1993 | Bosco et al. |
| 5,201,044 A | 4/1993 | Frey, Jr. et al. |
| 5,225,976 A | 7/1993 | Tawil |
| 5,233,513 A | 8/1993 | Doyle |
| 5,235,507 A | 8/1993 | Sackler et al. |
| 5,241,671 A | 8/1993 | Reed et al. |
| 5,276,816 A | 1/1994 | Cavendish et al. |
| 5,287,448 A | 2/1994 | Nicol et al. |
| 5,307,262 A | 4/1994 | Ertel |
| 5,307,265 A | 4/1994 | Winans |
| 5,359,509 A | 10/1994 | Little et al. |
| 5,359,660 A | 10/1994 | Clark et al. |
| 5,386,566 A | 1/1995 | Hamanaka et al. |
| 5,388,251 A | 2/1995 | Makino et al. |
| 5,394,555 A | 2/1995 | Hunter et al. |
| 5,410,648 A | 4/1995 | Pazel |
| 5,432,904 A | 7/1995 | Wong |
| 5,434,994 A | 7/1995 | Shaheen et al. |
| 5,446,653 A | 8/1995 | Miller et al. |
| 5,455,947 A | 10/1995 | Suzuki et al. |
| 5,471,575 A | 11/1995 | Giansante |
| 5,481,667 A | 1/1996 | Bieniek et al. |
| 5,483,632 A | 1/1996 | Kuwamoto et al. |
| 5,499,330 A | 3/1996 | Lucas et al. |
| 5,504,674 A | 4/1996 | Chen et al. |
| 5,504,675 A | 4/1996 | Cragun et al. |
| 5,517,405 A | 5/1996 | McAndrew et al. |
| 5,517,644 A | 5/1996 | Murdock |
| 5,523,942 A | 6/1996 | Tyler et al. |
| 5,535,323 A | 7/1996 | Miller et al. |
| 5,537,315 A | 7/1996 | Mitcham |
| 5,550,734 A | 8/1996 | Tarter et al. |
| 5,550,976 A | 8/1996 | Henderson et al. |
| 5,557,515 A | 9/1996 | Abbruzzese et al. |
| 5,564,043 A | 10/1996 | Siefert |
| 5,581,677 A | 12/1996 | Myers et al. |
| 5,586,310 A | 12/1996 | Sharman |
| 5,613,072 A | 3/1997 | Hammond et al. |
| 5,627,886 A | 5/1997 | Bowman |
| 5,630,127 A | 5/1997 | Moore et al. |
| 5,638,508 A | 6/1997 | Kanai et al. |
| 5,644,778 A | 7/1997 | Burks et al. |
| 5,652,842 A | 7/1997 | Siegrist, Jr. et al. |
| 5,655,085 A | 8/1997 | Ryan et al. |
| 5,673,402 A | 9/1997 | Ryan et al. |
| 5,689,706 A | 11/1997 | Rao et al. |
| 5,704,044 A | 12/1997 | Tarter et al. |
| 5,717,913 A | 2/1998 | Driscoll |
| 5,732,221 A | 3/1998 | Feldon et al. |
| 5,732,397 A | 3/1998 | DeTore et al. |
| 5,745,901 A | 4/1998 | Entner et al. |
| 5,748,953 A | 5/1998 | Mizutani et al. |
| 5,752,236 A * | 5/1998 | Sexton et al. ................... 705/4 |
| 5,768,505 A | 6/1998 | Gilchrist et al. |
| 5,768,506 A | 6/1998 | Randell |
| 5,768,578 A | 6/1998 | Kirk et al. |
| 5,797,134 A | 8/1998 | McMillan et al. |
| 5,806,078 A | 9/1998 | Hug et al. |
| 5,809,478 A | 9/1998 | Greco et al. |
| 5,809,496 A | 9/1998 | Byrd et al. |
| 5,815,152 A | 9/1998 | Collier et al. |
| 5,819,263 A | 10/1998 | Bromley |
| 5,832,481 A | 11/1998 | Sheffield |
| 5,832,530 A | 11/1998 | Paknad et al. |
| 5,835,897 A | 11/1998 | Dang |
| 5,835,914 A | 11/1998 | Brim |
| 5,850,442 A | 12/1998 | Muftic |
| 5,862,325 A | 1/1999 | Reed et al. |
| 5,864,875 A | 1/1999 | Van Huben et al. |
| 5,870,711 A | 2/1999 | Huffman |
| 5,873,066 A | 2/1999 | Underwood et al. |
| 5,877,757 A | 3/1999 | Baldwin et al. |
| 5,884,274 A | 3/1999 | Walker et al. |
| 5,895,461 A | 4/1999 | De La Huerga et al. |
| 5,899,998 A | 5/1999 | McGauley et al. |
| 5,903,873 A | 5/1999 | Peterson et al. |
| 5,907,705 A | 5/1999 | Carter |
| 5,907,848 A | 5/1999 | Zaiken et al. |
| 5,909,683 A | 6/1999 | Miginiac et al. |
| 5,913,198 A | 6/1999 | Banks |
| 5,914,714 A | 6/1999 | Brown |
| 5,915,241 A | 6/1999 | Giannini |
| 5,918,208 A | 6/1999 | Javitt |
| 5,930,759 A | 7/1999 | Moore et al. |
| 5,933,816 A | 8/1999 | Zeanah et al. |
| 5,937,189 A | 8/1999 | Branson et al. |
| 5,950,169 A | 9/1999 | Borghesi et al. |
| 5,950,196 A | 9/1999 | Pyreddy et al. |
| 5,953,526 A | 9/1999 | Day et al. |
| 5,956,687 A | 9/1999 | Wamsley et al. |
| 5,956,691 A | 9/1999 | Powers |
| 5,960,404 A | 9/1999 | Chaar et al. |
| 5,963,952 A | 10/1999 | Smith |
| 5,970,464 A | 10/1999 | Apte et al. |
| 5,974,392 A | 10/1999 | Endo |
| 5,982,369 A | 11/1999 | Sciammarella et al. |
| 5,987,430 A | 11/1999 | Van Horne et al. |
| 5,987,434 A | 11/1999 | Libman |
| 5,987,440 A | 11/1999 | O'Neil et al. |
| 5,991,733 A | 11/1999 | Aleia et al. |
| 5,991,756 A | 11/1999 | Wu |
| 5,995,939 A | 11/1999 | Berman et al. |
| 5,995,947 A | 11/1999 | Fraser et al. |
| 5,999,940 A | 12/1999 | Ranger |
| 6,012,053 A | 1/2000 | Pant et al. |
| 6,016,477 A | 1/2000 | Ehnebuske et al. |
| 6,016,504 A | 1/2000 | Arnold et al. |
| 6,029,150 A | 2/2000 | Kravitz |
| 6,029,195 A | 2/2000 | Herz |
| 6,038,393 A | 3/2000 | Iyengar et al. |
| 6,038,668 A | 3/2000 | Chipman et al. |
| 6,049,665 A | 4/2000 | Branson et al. |
| 6,061,657 A | 5/2000 | Whiting-O'Keefe |
| 6,064,983 A | 5/2000 | Koehler |
| 6,065,000 A | 5/2000 | Jensen |
| 6,065,047 A | 5/2000 | Carpenter et al. |
| 6,073,104 A | 6/2000 | Field |
| 6,081,832 A | 6/2000 | Gilchrist et al. |
| 6,088,702 A | 7/2000 | Plantz et al. |
| 6,088,710 A | 7/2000 | Dreyer et al. |
| 6,092,049 A | 7/2000 | Chislenko et al. |
| 6,098,070 A | 8/2000 | Maxwell |
| 6,105,007 A | 8/2000 | Norris |
| 6,112,986 A | 9/2000 | Berger et al. |
| 6,115,690 A | 9/2000 | Wong |
| 6,119,093 A | 9/2000 | Walker et al. |
| 6,128,598 A | 10/2000 | Walker et al. |
| 6,134,582 A | 10/2000 | Kennedy |
| 6,148,297 A | 11/2000 | Swor et al. |
| 6,163,770 A | 12/2000 | Gamble et al. |
| 6,185,540 B1 | 2/2001 | Schreitmueller et al. |
| 6,202,054 B1 | 3/2001 | Lawlor et al. |
| 6,208,973 B1 | 3/2001 | Boyer et al. |
| 6,223,165 B1 | 4/2001 | Lauffer |
| 6,223,343 B1 | 4/2001 | Hopwood et al. |
| 6,226,623 B1 | 5/2001 | Schein et al. |
| 6,236,972 B1 | 5/2001 | Shkedy |
| 6,236,975 B1 | 5/2001 | Boe et al. |
| 6,237,035 B1 | 5/2001 | Himmel et al. |
| 6,239,798 B1 | 5/2001 | Ludolph et al. |
| 6,240,408 B1 | 5/2001 | Kaufman |
| 6,253,203 B1 | 6/2001 | O'Flaherty et al. |
| 6,266,645 B1 | 7/2001 | Simpson |
| 6,272,471 B1 | 8/2001 | Segal |
| 6,272,472 B1 | 8/2001 | Danneels |
| 6,272,482 B1 | 8/2001 | McKee et al. |
| 6,272,528 B1 | 8/2001 | Cullen et al. |
| 6,301,621 B1 | 10/2001 | Haverstock et al. |
| 6,314,415 B1 | 11/2001 | Mukherjee |
| 6,314,419 B1 | 11/2001 | Faisal |
| 6,330,551 B1 | 12/2001 | Burchetta et al. |
| 6,336,096 B1 | 1/2002 | Jernberg |
| 6,341,265 B1 | 1/2002 | Provost et al. |
| 6,343,271 B1 | 1/2002 | Peterson et al. |
| 6,370,511 B1 | 4/2002 | Dang |

| | | |
|---|---|---|
| 6,389,400 B1 | 5/2002 | Bushey et al. |
| 6,389,588 B1 | 5/2002 | Wadhwa et al. |
| 6,401,079 B1 | 6/2002 | Kahn et al. |
| 6,408,277 B1 | 6/2002 | Nelken |
| 6,430,538 B1 | 8/2002 | Bacon et al. |
| 6,449,652 B1 | 9/2002 | Blumenau et al. |
| 6,452,607 B1 | 9/2002 | Livingston |
| 6,456,303 B1 | 9/2002 | Walden et al. |
| 6,460,036 B1 | 10/2002 | Herz |
| 6,467,081 B2 | 10/2002 | Vaidyanathan et al. |
| 6,473,748 B1 | 10/2002 | Archer |
| 6,477,533 B2 | 11/2002 | Schiff et al. |
| 6,480,956 B1 | 11/2002 | DiRienzo |
| 6,484,178 B1 | 11/2002 | Bence, Jr. et al. |
| 6,502,096 B1 | 12/2002 | Siefert |
| 6,505,176 B2 | 1/2003 | DeFrancesco et al. |
| 6,523,172 B1 | 2/2003 | Martinez-Guerra et al. |
| 6,560,592 B1 | 5/2003 | Reid et al. |
| 6,578,007 B1 | 6/2003 | Howes et al. |
| 6,584,467 B1 | 6/2003 | Haught et al. |
| 6,594,697 B1 | 7/2003 | Praitis et al. |
| 6,609,200 B2 | 8/2003 | Anderson et al. |
| 6,618,730 B1 | 9/2003 | Poulter et al. |
| 6,632,251 B1 | 10/2003 | Rutten et al. |
| 6,633,316 B1 | 10/2003 | Maddalozzo et al. |
| 6,636,242 B2 | 10/2003 | Bowman-Amuah |
| 6,643,652 B2 | 11/2003 | Helgeson et al. |
| 6,658,568 B1 | 12/2003 | Ginter et al. |
| 6,681,380 B1 | 1/2004 | Britton et al. |
| 6,714,914 B1 | 3/2004 | Peters et al. |
| 6,728,769 B1 | 4/2004 | Hoffmann |
| 6,775,658 B1 | 8/2004 | Zothner |
| 6,810,382 B1 | 10/2004 | Wamsley et al. |
| 7,024,418 B1 | 4/2006 | Childress |
| 7,095,426 B1 | 8/2006 | Childress |
| 7,124,112 B1 * | 10/2006 | Guyan et al. ............... 705/44 |
| 7,343,307 B1 | 3/2008 | Childress |
| 7,398,219 B1 | 7/2008 | Wolfe |
| 7,418,400 B1 | 8/2008 | Lorenz |
| 7,430,514 B1 | 9/2008 | Childress et al. |
| 7,430,515 B1 | 9/2008 | Wolfe et al. |
| 7,451,148 B2 | 11/2008 | Childress et al. |
| 7,571,107 B1 | 8/2009 | Jones et al. |
| 2001/0009033 A1 | 7/2001 | Morisaki et al. |
| 2001/0037224 A1 | 11/2001 | Eldridge et al. |
| 2001/0041992 A1 | 11/2001 | Lewis et al. |
| 2001/0041993 A1 | 11/2001 | Campbell |
| 2002/0002475 A1 | 1/2002 | Freedman et al. |
| 2002/0022976 A1 | 2/2002 | Hartigan |
| 2002/0035488 A1 | 3/2002 | Aquila et al. |
| 2002/0035491 A1 | 3/2002 | Dombroski |
| 2002/0091818 A1 | 7/2002 | Cascio et al. |
| 2002/0116228 A1 | 8/2002 | Bauer et al. |
| 2002/0120473 A1 | 8/2002 | Wiggins |
| 2002/0120917 A1 | 8/2002 | Abrari et al. |
| 2002/0138449 A1 | 9/2002 | Kendall et al. |
| 2002/0147617 A1 | 10/2002 | Schoenbaum et al. |
| 2002/0194023 A1 | 12/2002 | Turley et al. |
| 2002/0198753 A1 | 12/2002 | Feldman et al. |
| 2003/0018627 A1 | 1/2003 | Turner et al. |
| 2003/0033292 A1 | 2/2003 | Meisel et al. |
| 2003/0074353 A1 | 4/2003 | Berkan et al. |
| 2003/0078816 A1 | 4/2003 | Filep |
| 2003/0093302 A1 | 5/2003 | Quido et al. |
| 2003/0120477 A1 | 6/2003 | Kruk et al. |
| 2003/0120917 A1 | 6/2003 | Itonaga et al. |
| 2003/0158759 A1 | 8/2003 | Kannenberg |
| 2003/0187695 A1 | 10/2003 | Drennan |
| 2004/0030421 A1 | 2/2004 | Haley |
| 2005/0234791 A1 * | 10/2005 | Krasnerman ............... 705/35 |
| 2006/0100905 A1 * | 5/2006 | Christen ..................... 705/2 |
| 2006/0155588 A1 | 7/2006 | Kibar et al. |
| 2006/0253351 A1 | 11/2006 | Keaney |
| 2007/0050217 A1 | 3/2007 | Holden |
| 2009/0006137 A1 | 1/2009 | Wait et al. |
| 2009/0006138 A1 | 1/2009 | Wait et al. |
| 2009/0006139 A1 | 1/2009 | Wait et al. |

FOREIGN PATENT DOCUMENTS

| | | |
|---|---|---|
| EP | 0 465 018 | 1/1992 |
| EP | 0 836 779 | 3/1999 |
| EP | 0 926 608 | 6/1999 |
| JP | 10197285 | 7/1998 |
| JP | 10214283 | 8/1998 |
| JP | 111611711 | 6/1999 |
| JP | 2002014950 | 1/2002 |
| WO | 0201460 | 1/2002 |
| WO | WO 02/015079 | 2/2002 |

OTHER PUBLICATIONS

Federal Employee's Group Life Insurance Program Claim for Death Benefits. Jan. 14, 2006. http://web.archive.org/web/20060114090240/http://www.opm.gov/Forms/pdf_fill/fe6.pdf.*

FEGLI Designation of Beneficiary Forms. Aug. 15, 2000. http://www.opm.gov/forms/pdf_fill/sf2823.pdf.*

PCT Application No. PCT/US2008/065823, Search Report and Written Opinion mailed Dec. 18, 2008 (A1).

PCT Application No. PCT/US2001/20030, Search Report mailed Nov. 1, 2001.

New York Life Insurance Company. Waiver of Premium. Nov. 25, 2003. http://web.archive.org/web/20031125221006/http://www.newyorklife.com/cda/0,3254,11752,00.html.

Sun Life Insurance. Supplemental Benefits Webpage. Oct. 4, 2006. http://web.archive.org/web/20061004102802/http://www.sunlife.com.ph/insurance/individual/benefits.asp.

Wikipedia Webpage on Life Insurance. Jul. 3, 2005. http://web.archive.org/web/20050703013507/http://en.wikipedia.org/wiki/Life_insurance.

The Standard Insurance Life Insurance Benefits Application Instructions. Jul. 24, 2004. http://web.archive.org/web/20040724092055/http://www.standard.com/eforms/1794.pdf.

Quick quote Webpage on How to File Life Insurance Claims. Feb. 6, 2005. http://web.archive.org/web/20050206104522/http://www.quickquote.com/lifilehow.html.

The UN Health and Life Insurance Section on Life Insurance. Jun. 2, 2004. http://web.archive.org/web/20040602164522/http://www.un.org/Depts/oppba/accounts/insurance/lifeInsurance/claim.htm.

State Farm Webpage on Life Insurance Policy Claims made Simple. Aug. 11, 2006. http://web.archive.org/web/20060811222807/http://www.statefarm.com/insurance/claim_center/life/life.asp.

Findlaw Webpage on Insurnace Claim Do's and Don'ts. Sep. 1, 2006. http://web.archive.org/web/20060901031056/http://injury.findlaw.com/car-accident/car-accident-help/car-accident-basics-insurance.html.

U.S. Patent and Trademark Office, "Office Action" for U.S. Appl. No. 11/824,543 mailed Aug. 14, 2009.

U.S. Patent and Trademark Office, "Office Action" for U.S. Appl. No. 11/824,544 mailed May 26, 2009.

U.S. Patent and Trademark Office, "Office Action" for U.S. Appl. No. 11/824,539 mailed Jul. 22, 2009.

Investigations into database management system support for expert system shells (vols. I and II) by Johnson, Verlyn Mark, Ph. D, University of Minnesota, 1993, Abstract (Q2).

U.S. Patent and Trademark Office, "Communication" for U.S. Appl. No. 10/422,450 mailed Mar. 2, 2009.

Australian application—Examiner's report on patent aplication 2001268693, Apr. 21, 2006 (Q1).

http://web.archive.org/web/20000605062238/http://www.wawanesa.com/insure_claims_process.htm, (Wawanesa Insurance) Jun. 5, 2000 (Q3).

U.S. Patent and Trademark Office, "Communication" for U.S. Appl. No. 09/602,687 mailed Mar. 6, 2009.

U.S. Patent and Trademark Office, "Communication" for U.S. Appl. No. 09/603,130 mailed Dec. 29, 2008.

U.S. Patent and Trademark Office, "Communication" for U.S. Appl. No. 10/285,292 mailed Apr. 19, 2007.

U.S. Patent and Trademark Office, "Communication" for U.S. Appl. No. 10/285,292 mailed Sep. 26, 2007.

U.S. Patent and Trademark Office, "Communication" for U.S. Appl. No. 10/285,292 mailed Mar. 18, 2008.

U.S. Patent and Trademark Office, "Communication" for U.S. Appl. No. 10/285,292 mailed Oct. 17, 2008.
U.S. Patent and Trademark Office, "Communication" for U.S. Appl. No. 10/285,292 mailed Feb. 19, 2009.
U.S. Patent and Trademark Office, "Notice of Allowance" for U.S. Appl. No. 10/285,292 mailed Sep. 4, 2009.
U.S. Patent and Trademark Office, "Communication" for U.S. Appl. No. 10/285,289 mailed Apr. 4, 2008.
U.S. Patent and Trademark Office, "Communication" for U.S. Appl. No. 10/285,289 mailed Oct. 29, 2008.
U.S. Patent and Trademark Office, "Communication" for U.S. Appl. No. 10/285,289 mailed Feb. 19, 2009.
U.S. Patent and Trademark Office, "Communication" for U.S. Appl. No. 10/285,289 mailed Jul. 22, 2009.
U.S. Patent and Trademark Office, "Communication" for U.S. Appl. No. 10/285,339 mailed Apr. 28, 2005.
U.S. Patent and Trademark Office, "Communication" for U.S. Appl. No. 10/285,339 mailed Oct. 20, 2005.
U.S. Patent and Trademark Office, "Communication" for U.S. Appl. No. 10/285,339 mailed Mar. 20, 2006.
U.S. Patent and Trademark Office, "Communication" for U.S. Appl. No. 10/285,339 mailed Sep. 7, 2006.
U.S. Patent and Trademark Office, "Communication" for U.S. Appl. No. 10/285,339 mailed Aug. 10, 2007.
U.S. Patent and Trademark Office, "Communication" for U.S. Appl. No. 10/285,339 mailed Feb. 19, 2008.
U.S. Patent and Trademark Office, "Communication" for U.S. Appl. No. 10/285,339 mailed Jul. 1, 2008.
U.S. Patent and Trademark Office, "Communication" for U.S. Appl. No. 10/285,375 mailed Jun. 21, 2007.
U.S. Patent and Trademark Office, "Communication" for U.S. Appl. No. 10/285,375 mailed Oct. 18, 2007.
U.S. Patent and Trademark Office, "Communication" for U.S. Appl. No. 10/285,375 mailed Apr. 16, 2008.
U.S. Patent and Trademark Office, "Communication" for U.S. Appl. No. 10/285,375 mailed Mar. 15, 2009.
U.S. Patent and Trademark Office, "Communication" for U.S. Appl. No. 10/285,375 mailed Sep. 29, 2008.
U.S. Patent and Trademark Office, "Office Action" for U.S. Appl. No. 10/285,375 mailed Sep. 30, 2009.
U.S. Patent and Trademark Office, "Communication" for U.S. Appl. No. 10/285,338 mailed Jul. 3, 2007.
U.S. Patent and Trademark Office, "Communication" for U.S. Appl. No. 10/285,338 mailed Jan. 23, 2008.
U.S. Patent and Trademark Office, "Communication" for U.S. Appl. No. 10/285,338 mailed Jul. 25, 2008.
U.S. Patent and Trademark Office, "Communication" for U.S. Appl. No. 10/285,338 mailed Feb 4, 2009.
U.S. Patent and Trademark Office, "Notice of Allowance" for U.S. Appl. No. 10/285,338 mailed Sep. 4, 2009.
U.S. Patent and Trademark Office, "Communication" for U.S. Appl. No. 10/285,293 mailed Feb. 7, 2006.
U.S. Patent and Trademark Office, "Communication" for U.S. Appl. No. 10/285,293 mailed Aug. 9, 2006.
U.S. Patent and Trademark Office, "Communication" for U.S. Appl. No. 10/285,293 mailed Sep. 5, 2007.
U.S. Patent and Trademark Office, "Decision on Appeal" for U.S. Appl. No. 10/285,293 mailed Sep. 3, 2009.
U.S. Patent and Trademark Office, "Communication" for U.S. Appl. No. 10/422,632 mailed May 14, 2008.
U.S. Patent and Trademark Office, "Communication" for U.S. Appl. No. 10/422,632 mailed Jan. 30, 2009.
U.S. Patent and Trademark Office, "Communication" for U.S. Appl. No. 10/422,450 mailed Feb. 5, 2008.
U.S. Patent and Trademark Office, "Communication" for U.S. Appl. No. 10/422,450 mailed Aug. 20, 2008.
Jobling, Tom, "DST Implements imaging for mutual fund industry," Business Wire, New York, Dec. 18, 1989, Sec. 1 p. 1. (Y1).
"Eliminating the paper chase," Best's Review, Oldwick, Mar. 1992, vol. 92, iss. 11; pp. 54-57 (Y2).
"DST to market workflow system," Insurance systems bulletin, London, Nov. 1994, vol. 10, issue 5, p. 5. (Y3).
West, Diane, "New world in claims, customer admin. systems," National Underwriter, Erlanger, Sep. 16, 1996, vol. 100, iss. 38, pp. 20-22. (Y4).
Graver, Matt, "USAA implements automated work distributor (AWD)," Inform, Silver Spring, May 1998, vol. 12, Iss. 5, pp. 54-59. (Y5).
"Osborn Laboratories chooses CSC system to enhance service to customers," PR Newswire, New York, Jun. 17, 1998, p. 1 (Y6).
"DST systems integrates workflow management software into computer associates Unicenter TNG," PR Newswire, New York, Sep. 23, 1998, p. 1 (Y7).
Hill, Stephen, "Continuous Improvement," Work Process Improvement Today, Boston, Dec. 1998, vol. 20, iss. 5, pp. 10-12 (Y8).
U.S. Appl. No. 09/429,808, filed Oct. 19, 1999.
U.S. Patent and Trademark Office, "Final Office Action" for U.S. Appl. No. 11/824,543 mailed Mar. 3, 2010.
U.S. Patent and Trademark Office, "Final Office Action" for U.S. Appl. No. 11/824,544 mailed Dec. 17, 2009.
U.S. Patent and Trademark Office, "Final Office Action" for U.S. Appl. No. 11/824,539 mailed Jan. 11, 2010.
U.S. Patent and Trademark Office, "Office Action" for U.S. Appl. No. 11/824,539 mailed Aug. 18, 2010.
U.S. Patent and Trademark Office, "Office Action" for U.S. Appl. No. 11/824,544 mailed Aug. 18, 2010.
U.S Patent and Trademark Office, "Office Action" for U.S. Appl. No. 11/824,543 mailed Sep. 30, 2010.
U.S. Patent and Trademark Office, "Notice of Allowance" for U.S. Appl. No. 11/824,543 mailed Apr. 4, 2011.
U.S. Patent and Trademark Office, "Notice of Allowance" for U.S. Appl. No. 11/824,544 mailed Apr. 4, 2011.
U.S. Patent and Trademark Office, "Notice of Allowance" for U.S. Appl. No. 11/824,539 mailed Apr. 1, 2011.

* cited by examiner

Policy Portfolio

| Product | Policy # | Status | Role | Source | Date Updated |
|---|---|---|---|---|---|
| Term | FV0001508F | Active | Insured | Vantage | 02/20/2006 |
| Whole Life | FV0001311F | Active | Insured | CyberLife | 01/13/2006 |
| Whole Life | FV0003490A | Active | Insured | Manual | 03/20/2006 |

[Associate] [Dissociate] [Add Manual Policy] [Search]

*FIG. 7*

CLAIMS PROCESSING HIERARCHY FOR INSURED

PRIORITY CLAIM

This application claims priority to U.S. Provisional Patent Application Ser. No. 60/941,886 filed on Jun. 4, 2007, entitled "MULTIPLE POLICY CLAIMS PROCESSING", the disclosure of which is hereby incorporated by reference.

BACKGROUND OF THE INVENTION

1. Field of the Invention

The present invention generally relates to claims processing for policies relating to the life and health of a person, such as a life insurance policy, an annuity policy, a disability insurance policy, a supplementary health, a medicare supplementary benefits policy, a long-term care insurance policy, or any policy paying benefits or requiring a policy change on an event such as death, terminal illness, disability, a need for long-term care, health changes, medical/health services. In particular, embodiments relate to systems and methods of processing claims on multiple policies.

2. Description of the Related Art

To administer a claim for benefits provided by a life insurance policy, an annuity policy, a disability insurance policy, a supplementary health, a medicare supplementary benefits policy, a long-term care insurance policy, or any policy paying benefits similar to those above, a substantial amount of information must be collected and managed. Appropriate documentation must be identified and obtained, such as death certificates in the case of a claim of a life insurance benefit or medical provider verification of condition or service in the case of health/supplementary health. Handling claims relating to a given insured from the time that notice is received through final settlement and payment may involve collecting numerous pieces of documentation (police report, medical examination reports, etc.) to support payment on the claims, tracking numerous documents, generating and receiving numerous pieces of correspondence, and calculating and issue payment to multiple beneficiaries. Managing such information can be cumbersome and time consuming.

In some cases, an insured has more than one policy with a particular insurance company or its servicing affiliates. For example, an individual may have life insurance policies, a disability policy, and a long-term care policy with the same company, or processed by the same company on behalf of one or more other companies. Each policy may have different beneficiaries, premiums, and other terms and conditions.

Typically, an insurance carrier may look at claims for an insured on a policy-by-policy basis. The administration of claims for insureds with more than one policy can be fragmented and paper intensive. For example, if an insured has two life insurance claims with an carrier, the carrier may generate two sets of information requirements, one for each policy, issue two checks to beneficiaries, one for each policy, etc. Fulfilling such information requirements in such cases involves duplication in the claims administration process, providing additional opportunities for error, fraud and other management issues. Additional, more interaction may be required with outside persons and entities. The additional red tape may also place burdens on the insured or the insured family members. For example, a grieving spouse may receive a request for a death certificate under one policy, even if the spouse has already provided the request for another policy.

SUMMARY

Various embodiments of processing claims are disclosed. In an embodiment, a method of processing insurance claims relating to the life and/or health of an insured (e.g., life insurance, annuity, disability insurance, supplementary health, medicare supplementary benefits, long-term care insurance) includes receiving at least one notice of an event or condition that gives rise to a claim for payment under a first insurance policy covering the insured. A hierarchy may be created for claims specific to the insured that includes a claim management case level and a policy level. In some embodiments, the hierarchy may include a coverage level. In some embodiment, supplementary levels are included for related benefits and related parties (for example designees of proceeds) in addition to basic levels of claim, policy and coverage. The claim management case level may include a claim management case node. The policy level may include one or more policy nodes. Each of the policy nodes may relate to an insurance policy covering the insured. The one or more insurance policies covering the insured are associated with the claim management case. The coverage level may include one or more coverage nodes. Each of the coverage nodes may relate to an insurance coverage covering the insured. Each of the insurance coverages is associated with one of the insurance policies. Nodes for designees (e.g., beneficiaries) may be attached the insurance policies and/or coverages and/or benefits, as applicable. Some processes (e.g., fulfillment of information requirements such as a death certificate) relating to the insured are performed at the claim management case level. Other processes may be performed at the policy level or at the coverage level. In one embodiment, processing performed at the claim management case level applies to all of the policies and coverages on a particular insured.

In some embodiments, a policy portfolio view for the claim management case is displayed to a user. The policy portfolio view includes a representation of the insurance policies for the claim management case (e.g., all the policies relating to a specific insured). These policies may be determined to be within the scope of the claim management case in which case the policies are associated to the claim management case, or they may be outside the scope of the claim management case in which case they are not associated to the claim management case.

In another embodiment, a method includes creating a claim management case for an insured in response to a notice of a claim. One or more insurance policies covering the insured are associated with the claim management case. In some embodiments, all of the insurance policies covering the insured are associated with the claim management case. At least one process relating to the claim management case is performed at a claim management case level. The process performed at the claim management case level applies to at least one of the insurance policies associated with the claim management case. In one embodiment, the processes performed at the claim management case level apply to all the insurance policies associated with the claim management case. One or more processes relating to the claim management case are performed at a policy level. Claims are adjudicated under the two or more of the insurance policies covering the insured. In some embodiments, adjudication of any claim on the insurance policies may be inhibited until one or more predetermined requirements are satisfied for the claim management case.

In another embodiment, a claim management case is created for an insured in response to a notice. Two or more insurance policies covering the insured are associated with the claim management case. At least one process is performed at a claim management case level to fulfill an information requirement that applies to at least two of the insurance policies associated with the claim management case. Claims are adjudicated under the one or more of the insurance policies covering the insured.

In another embodiment, a method of processing insurance claims relating to the life or health of an insured includes receiving at least one notice of an event or condition that gives rise to a claim for payment under a first insurance policy covering the insured. A hierarchy is created including a claim management case level and a policy level. The claim management case level includes a claim management case node. The claim management case node relates to a designee under the first insurance policy. The policy level includes one or more policy nodes. Each of the policy nodes is associated with an insurance policy relating to the designee. At least one process for the claim management case is performed at the claim management case level. The process applies to at least one insurance policy relating to the designee.

BRIEF DESCRIPTION OF THE DRAWINGS

A better understanding of the present invention may be obtained when the following detailed description of preferred embodiments is considered in conjunction with the following drawings, in which:

FIG. 7 illustrates a policy portfolio view according to one embodiment.

Figure 1:
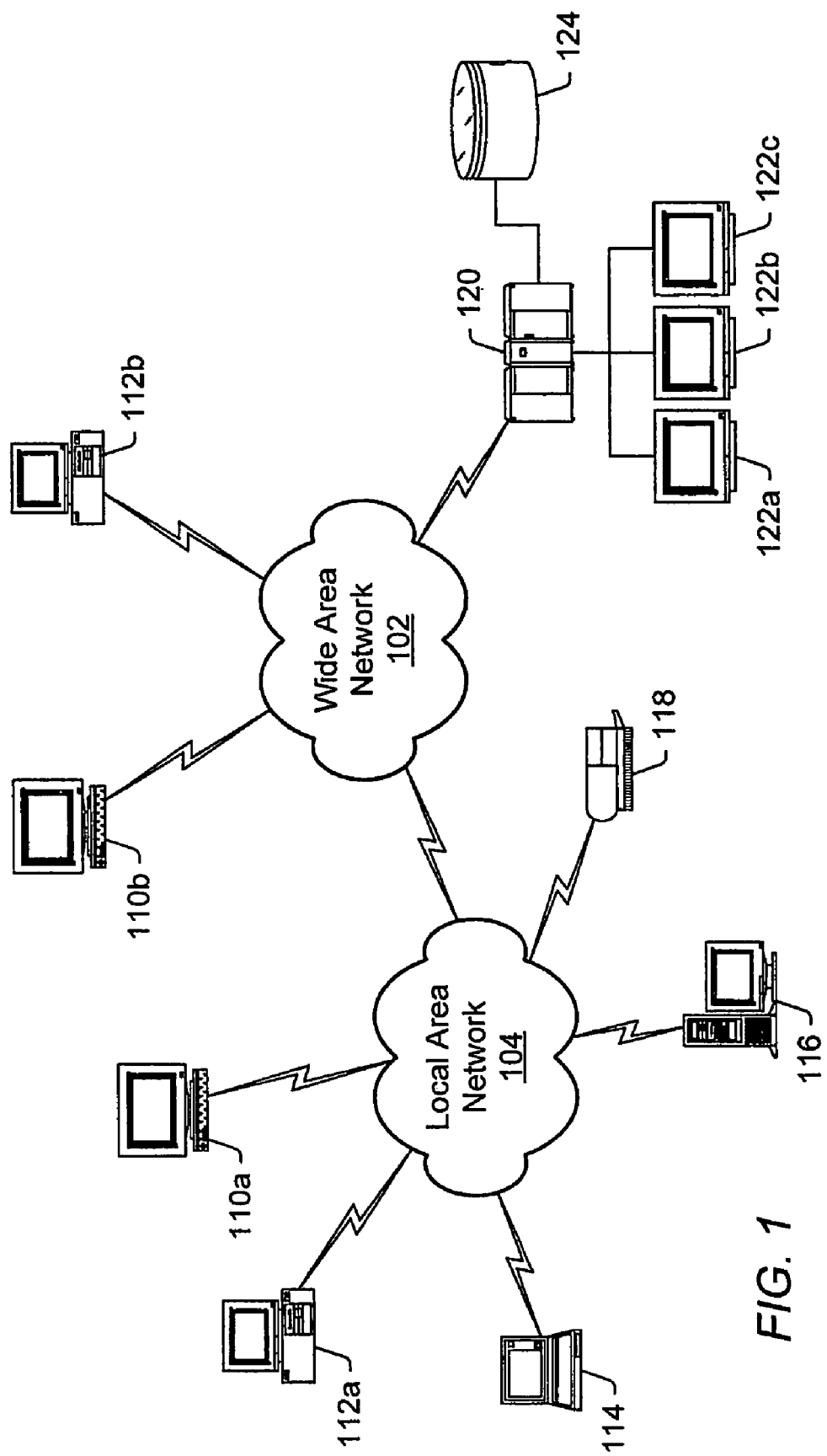
FIG. 1 illustrates a network diagram of a wide area network suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended requests. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF ILLUSTRATIVE EMBODIMENTS

FIG. 1 illustrates an embodiment of a wide area network ("WAN"). WAN 102 may be a network that spans a relatively large geographical area. The Internet is an example of WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more local area networks ("LANs") 104 may be coupled to WAN 102. LAN 104 may be a network that spans a relatively small area. Typically, LAN 104 may be confined to a single building or group of buildings. Each node (i.e., individual computer system or device) on LAN 104 may have its own CPU with which it may execute programs, and each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices such as one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs 104 through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104 for purposes of example, workstation 110b and personal computer 112b. For example, WAN 102 may include computer systems that may be geographically remote and connected to each other through the Internet.

Figure 2:
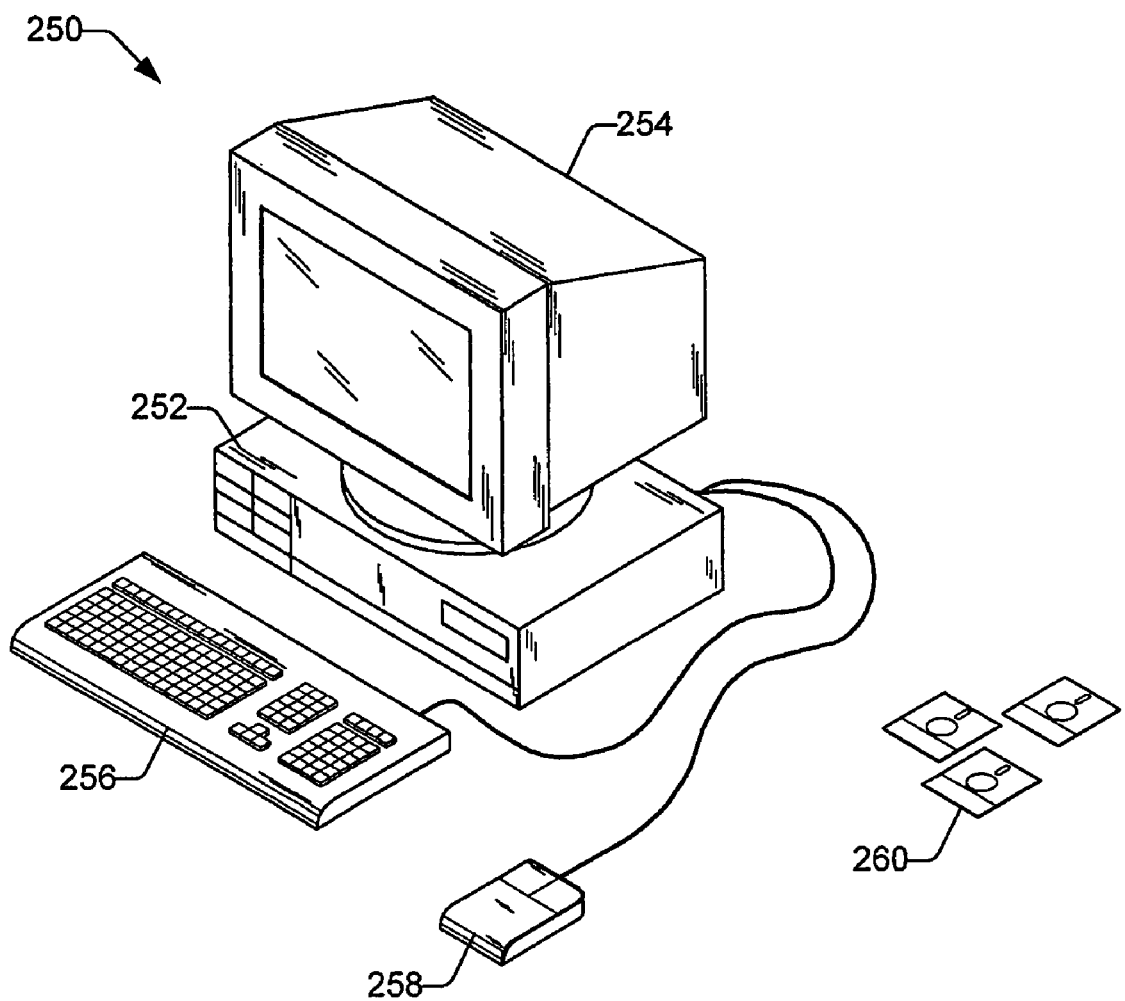
FIG. 2 illustrates a computer system suitable for implementing various embodiments.

FIG. 2 illustrates an embodiment of computer system 250 that may be suitable for implementing various embodiments of a system and method for processing claims. Each computer system 250 typically includes components such as CPU 252 with an associated memory medium such as disks 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for processing claims.

Computer system 250 may include a memory medium on which computer programs according to various embodiments may be stored. The term "memory medium" is intended to include an installation medium, e.g., a CD-ROM or floppy disks 260, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for processing insurance claims. The software program(s) may be implemented in various ways, including, but not limited to, procedure-based techniques, component-based techniques, and/or object-oriented techniques, among others. For example, the software programs may be implemented using Java, ActiveX controls, C++ objects, JavaBeans, Microsoft Foundation Classes ("MFC"), browser-based applications (e.g., Java applets), traditional programs, or other technologies or methodologies, as desired. A CPU such as host CPU 252 executing code and data from the memory medium may include a means for creating and executing the software program or programs according to the embodiments described herein.

Various embodiments may use a service-oriented architecture. In a system using service-oriented architecture, functions may be defined using a description language. Interfaces may be invoked to perform business processes. The interfaces may be independent of the platform on which the systems operate. Therefore, the services may be used regardless of the device, operating system, or communication protocol.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Figure 3:
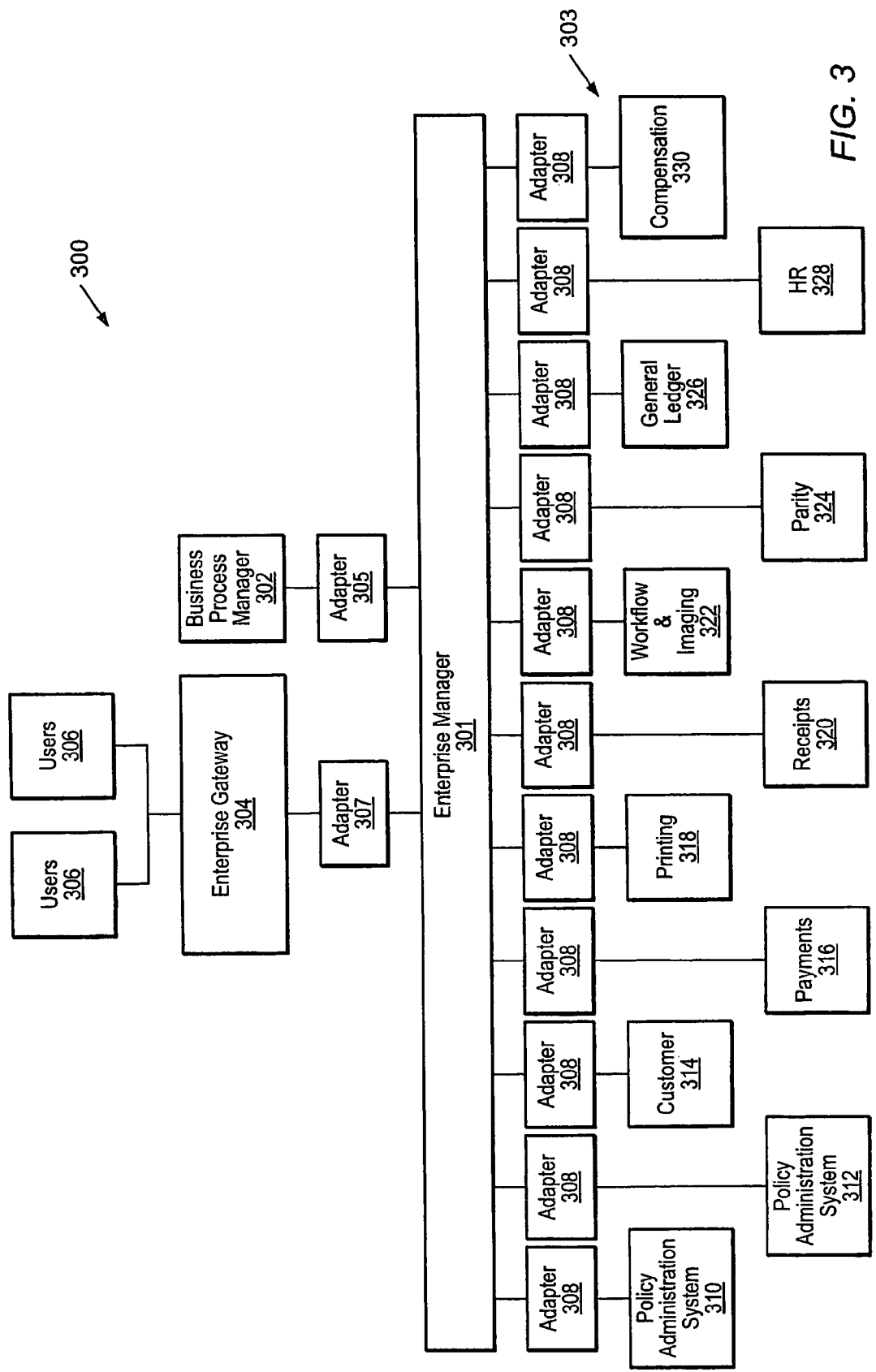
FIG. 3 illustrates a system suitable for implementing various embodiments.

FIG. 3 illustrates a system that may be used to process claims according to one embodiment. System 300 includes enterprise manager 301, business process manager 302, application systems 303, and enterprise gateway 304.

Application systems 303 may include policy administration systems 310 and 312. Policy administration systems 310 and 312 may process insurance claims. Applications systems 303 may also include various enterprise applications, including customer 314, payments 316, printing 318, receipts 320, workflow and imaging 322, parity 324, general ledger 326, human resources 328, and compensation 330. Various adapters 308 may be provided between applications 303 and enterprise manager 301.

Business process manager 302 and enterprise manager 301 may be coupled via adapter 305. Enterprise gateway 304 may serve as a gateway between enterprise manager 301 and user devices 306 via adapter 307. User devices 306 may include, for example, a web-based browser. Application systems 303 and enterprise manager 301 may be coupled via adapter 308. Each of adapters 308 may be different from one another as appropriate to the application. Adapter 305, adapter 307, and adapters 308 may be combined in some embodiments.

In some embodiments, a system may be implemented in a multi-tier architecture. For example, a system may include a client/presentation tier, business process management tier, a business services tier, and a data services tier.

In some embodiments, a system may be based on open standards. Examples of standards include J2EE, BPML, UML, LDAP, WSDL, SOAP, XML, Schema and XSLT as well as industry standards such as STP, TMF, CPFR and SCOR. In one embodiment, an industry-standard ACORD integration engine enables integration with multiple policy administration and other systems. Suitable data specifications may include ACORD's TXLife and XMLife or any other agreed standard for exchange of business context specific data. In some embodiments, reinsurers, providers and/or vendors can be integrated into the system for processing information requirements, notification of claim and payment, and to facilitate other claims processes such as reinsurance recovery.

In some embodiments, a system includes a rule and calculation engine. The rule and calculation engine may also allow a user to configure the system to meet particular business needs.

In some embodiments, a system includes a thin-client common front end. The common front end may provide a single claims view for all types of claims. Views can be tailored to specific types of users, such as call center representatives, who handle notification and status calls, and back-office claims processors and adjudicators.

In some embodiments, a back office system may be provided. Back office users may handle more complex business processes and processes that remain active over a longer period of time. The back office may include access to management reports. Through the back office, managers may have access to all functions within their business unit in order to provide advice and to handle issues. In one embodiment, the back office may be provided as a thin client.

Claims Processing

Various embodiments include methods of processing claims for under insurance policies and other contracts relating to the life and/or health of a person, such as death (e.g., under a life insurance policy), waiver, disability and specialty claims, such as critical illness and long-term care insurance. Examples of insurance policies relating to the life and health of a person include a life insurance policy, an annuity policy, a disability insurance policy, a supplementary health, a medicare supplementary benefits policy, a long-term care insurance policy, or any policy paying benefits or requiring a policy change on an event such as death, terminal illness, disability, a need for long-term care, health changes, medical/health services. Claims may relate to actions such as paying benefits or requiring a policy change on an event such as death, terminal illness, disability, a need for long-term care, health changes, medical/health services. A claims processing system may support processing of various claim types such as waiver of premium claims, accelerated death claims (also known as living benefits, critical illness benefits and terminal illness benefits), and death. In certain embodiments, a method may include managing and/or accounting for Medicare or Medicaid coordination requirements. In certain embodiments, a method may include managing and/or accounting for worker's compensation claims. In certain embodiments, a single system is provided for all claims types, including death, waiver, disability and long-term care claims.

Example of Claims Processing Using Hierarchy

In various embodiments, claims are processed according to a hierarchy. In some embodiments, claims are processed according a hierarchy that is established specific to an insured. Policies that may possibly be affected (e.g., all policies with a carrier that cover the insured) may be associated with a claim management case. All the policies may be viewed at once in a policy portfolio.

In some embodiments, claims are processed according a hierarchy that is established specific to a designee. Policies that may possibly be affected (e.g., all policies on the claim management case) may be associated with a designee.

A claim management case may address obligations or potential obligations of an insurance company relating to a particular insured that arise from an event or condition (e.g., death of the insured) for one or more insurance policies managed by an insurance administration system. In some embodiments, a claim management case may address potential obligations of an insurance carrier under all of its policies covering an insured. For example, an insurance carrier may have three life insurance policies on the life of Mr. Smith. Each of the life insurance policies may have different beneficiaries, premiums, and other terms and conditions. All three of the life insurance policies may be managed in a single claim management case. In other embodiments, a claim management case may be a subset of all the policies the insurance carrier has with the insured. An insured may be one person or more than one person.

As used herein, "condition" includes any condition, circumstance or combination of conditions, events, and/or circumstances. For example, a condition may be the death of an insured. As another example, a condition may be the death of an insured caused by an accident in which the death occurs with 90 days of the accident and in which the insured is age 60 or less. As another example, a condition may be a disability of an insured that lasts for more than 3 months. An event or condition may include a notice of loss concerning a policy.

Figure 4A:
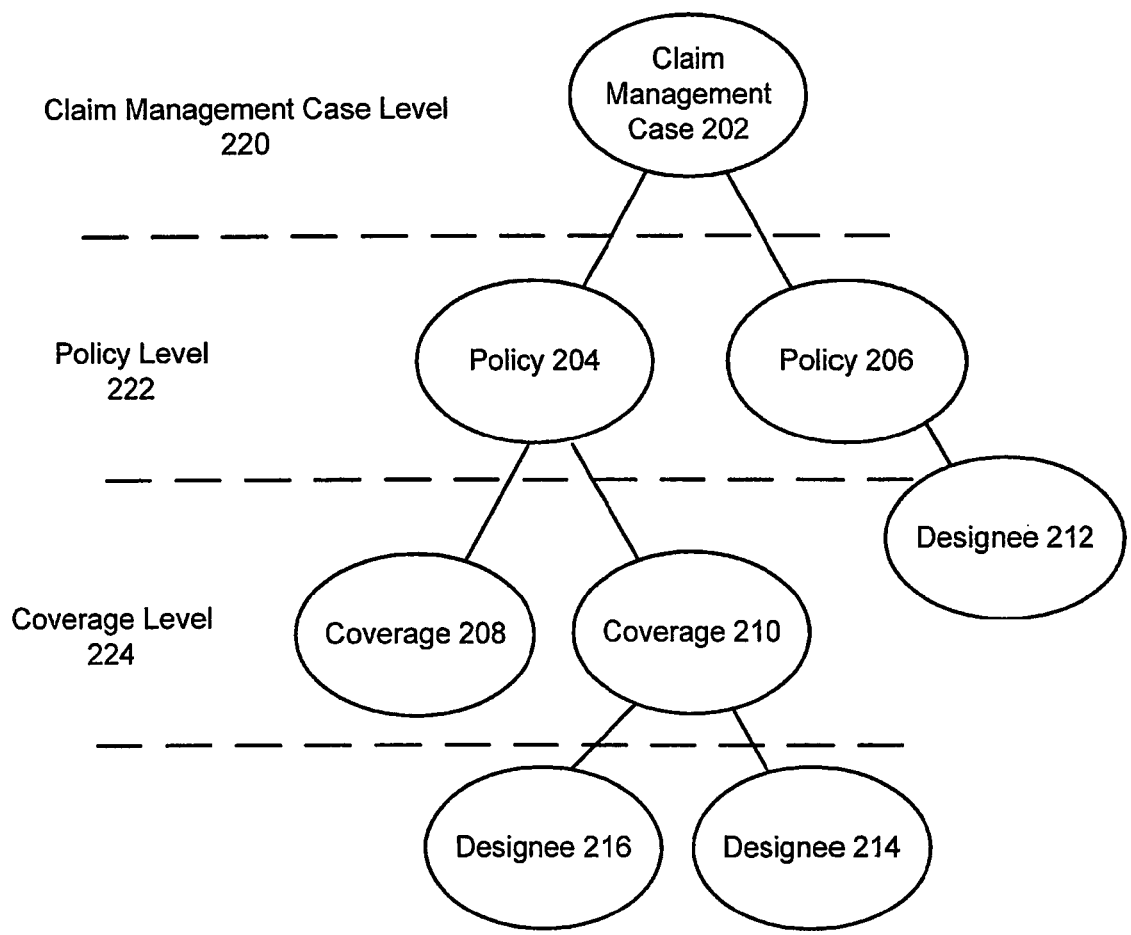
FIG. 4a illustrates a flowchart of a claim hierarchy according to one embodiment.

FIG. 4a is a diagram of a claim hierarchy according to one embodiment. Claim management case 202 is at a claim management case level 220. Policies 204 and 206 are at policy level 222. Policies 204 and 206 are associated with claim management case 202. Coverages 208 and 210 are at coverage level 224. Coverages 208 and 210 may be associated with policy 204. Coverages 208 and 210 may include, for example, base coverages or riders. Any number of policies may be associated with claim management case 202. Any number of coverages (including no coverages) may be associated with each of policies 204 and 206. Designee 212 may be associated with policy 206. Designees 214 and 216 are associated with coverage 210. Designees may include beneficiaries (e.g., primary, contingent), collateral assignees, and fixed assignees. Any number of designees may be attached to each of the various policies and coverages, as appropriate. Requirements may be attached to nodes at any level in the hierarchy.

Claim related data may be associated to the most general node to which the data applies. For example, if the data is relevant to the whole claim management case, then it will be associated to the claim management node 202. This data will be in scope for all policies associated with the claim management case. If the data is relevant to a specific policy (e.g., policy 204), it will be associated to the applicable policy node. If the data is relevant to a specific coverage (e.g., coverage 208), it will be associated to the applicable coverage node. If the data is relevant to a specific benefit (e.g., designee 212), it will be associated to the applicable benefit node. In some embodiments, the node structure is included in various procedures and data structures within a service-oriented architecture. As used herein, "claim related data" includes any data relating to a claim, such as an information requirement, a designation, an insured name, a notice of loss, a disbursement amount, or an interest calculation result.

After node relationships are established for a specific insured, claims processing may be carried out on a level-by-level basis within the claim management case. For example, if policies 204 and 206 are both life insurance policies on Mr. Smith, both policies would require a death certificate in the event of a claim on the death of Mr. Smith. In this case, processing of the information requirement for a death certificate for Mr. Smith may occur at claim management level, since one death certificate will suffice for both policies 204 and 206.

Figure 4B:
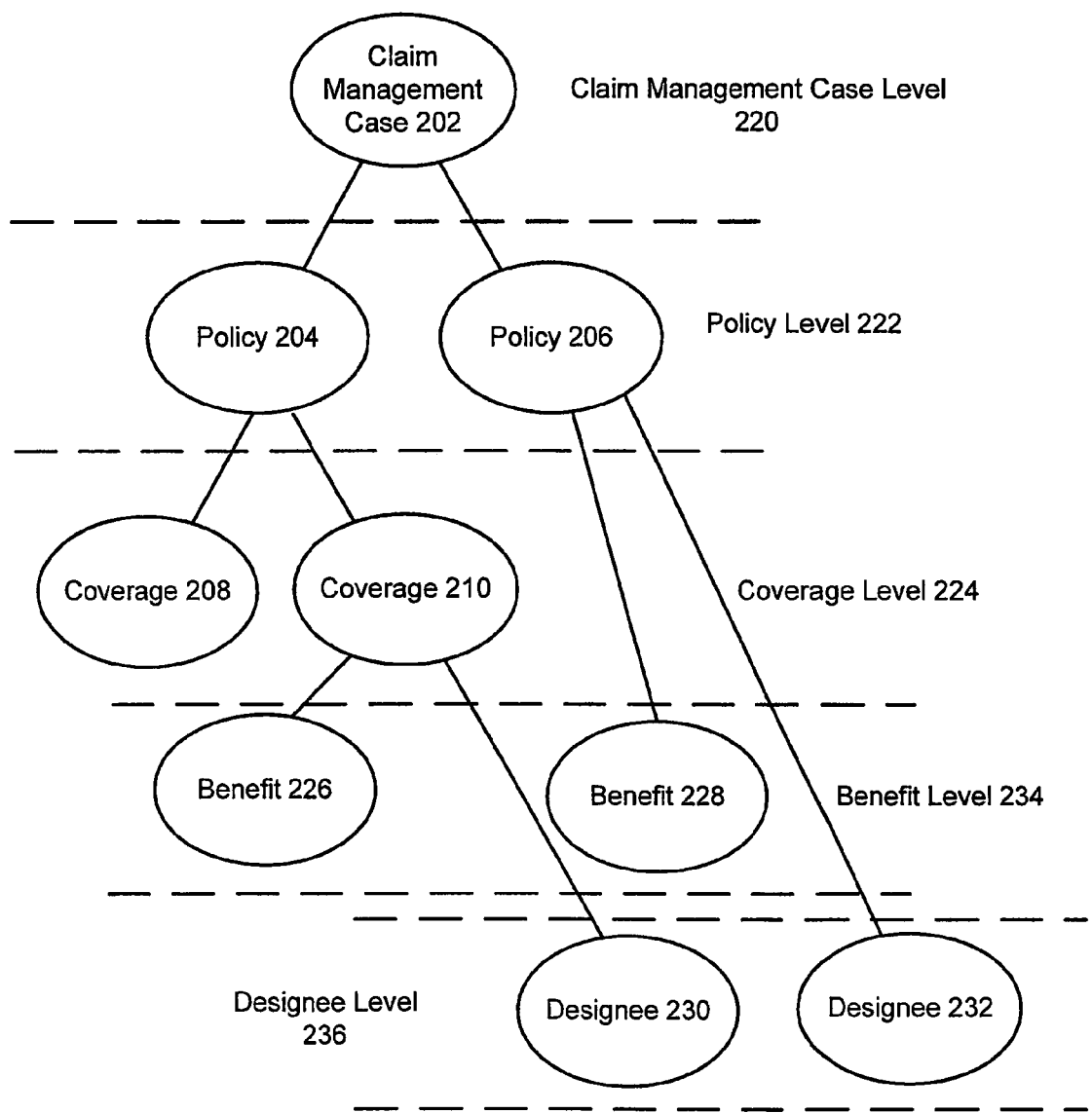
FIG. 4b illustrates a hierarchy including a benefit level and a designee level according to one embodiment.

In some embodiments, benefits may be provided as a dimension to a node hierarchy. In some embodiments, benefits may be provided as a dimension to a node hierarchy. In some embodiments, benefits and designees may each be provided as additional dimensions to a node hierarchy. For example, benefits may be applicable at policy or coverage level and designees may be applicable at policy or coverage level. Requirements may be applicable to the claim, policy, coverage, benefit or designee nodes. FIG. 4b illustrates a hierarchy including a benefit level and a designee level according to one embodiment. Benefits 226 and 228 may be provided at benefit level 234. Designees 230 and 232 may be provided at designee level 236. Any number of designees and benefits may be attached to any of the policies and/or coverages. In some embodiments, benefits and designees may all be at the same level. For example, benefits, designees, and coverages may be associated to a particular policy. In certain embodiments, designee nodes may be attached to benefit nodes, or vice versa.

The following is an example of a hierarchy that may be used for processing claims. In the listing below, each level of indentation indicates a lower level in the hierarchy.

```
Claim
    Requirement
    Policy
        Requirement
        Designee
            Requirement
        Benefit
            Requirement
            Designee
                Requirement
        Coverage
            Requirement
            Designee
                Requirement
            Benefit
                Requirement
                Designee
                    Requirement
```

Figure 4C:
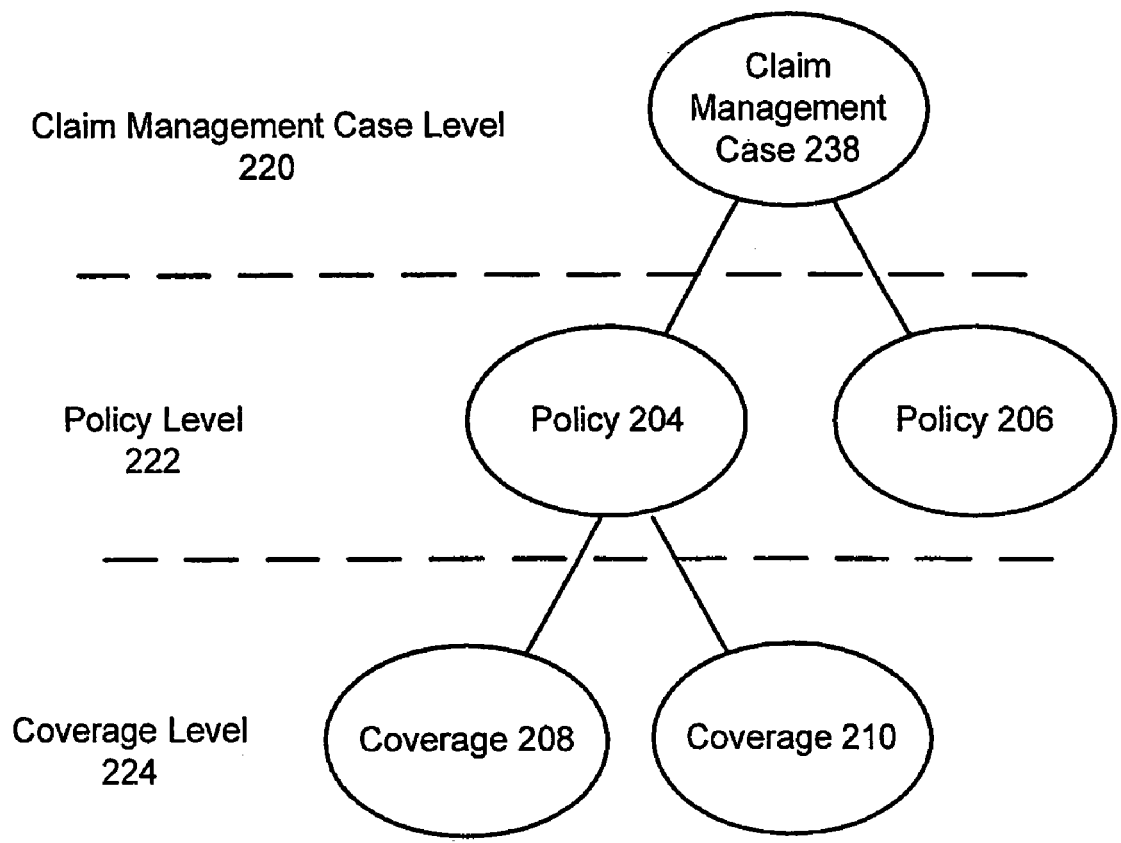
FIG. 4c illustrates a hierarchy for claims relating to a designee or set of designees according to one embodiment.

FIG. 4c illustrates a hierarchy for claims by a particular designee according to one embodiment. A designee may be one person or more than one person. Claim management case 238 may include all policies associated with a designee. In some embodiments, claim management case 238 may include all policies associated with a set of designee (e.g., all the members of a family). In some embodiments, claim management case 238 may include only a subset of the claims associated with a designee. Any number benefits may be attached to any of the policies and/or coverages. In some embodiments, insured may be attached to one or more policies and/or coverages Example Claims Process In an embodiment, designations can be established at a coverage level (rider or increase) or at a policy level. If there are multiple policies for the same insured, the same beneficiary designation could be established for each policy or could vary from policy to policy. Designations for a coverage may be modifiable until the first payment of proceeds occurs. Once payment has been made to a designee, then modifications from that individual up to policy level may be prohibited.

A payment can be made to the designee established/designated to receive the flat dollar amount (if all of their requirements are satisfied), while a determination is made surrounding the establishment of the remaining beneficiaries. For example, there may be a collateral assignee who can be paid even though the beneficiary proceeds are not payable.

Proceed designations may be entered, displayed and maintained on a single view within the claim system. This view shows all collateral and or payee assignments established on the individual policies and coverages associated with a claim. The beneficiary designation and the appropriate allocations, once verified, may be maintained on this view.

In order to pay/process a claim, claim requirements may be established and resolved, either by receipting and validating or by waiving. In certain embodiments, claim requirements are established at a claim level, policy level, coverage level, and designee/beneficiary level.

In claim adjudication, a claim may be evaluated to determine the policy and or coverage and or benefit proceeds available to be settled and paid for any and all designated beneficiaries and or assignees; as well as any associated payees. To adjudicate a life claim, the claims examiner must perform a thorough review of all claims related information concerning the claim in question. This information includes comments, notification information, imaged sources, entity designations, requirements resolution, and correspondence.

Upon determination that all claims related information received ensures completeness and satisfies the necessary requirements to adjudicate a claim, specific details surrounding such decision can be recorded. Such details may include Proof of Loss Date, Proof of Death Date, Date of Birth (DOB) from the death certificate, etc. In some embodiments, if a benefit can be paid to at least one beneficiary, assignee, and or collateral assignee, then the claim may proceed to settlement, payment, authorization, and disbursement processes can be initiated.

Payment processing may not be allowed until proceeds have been approved for payment through adjudication. Adjudication will result in a settlement being created. A settlement may include a single designee's proceeds from a whole policy, a selection of coverage items on a policy, or a single coverage item. The amount of the settlement will be the sum of the claim amount items on the coverage item(s) in the settlement. The settlement may be initialized with a single default payment for amount of the settlement proceeds, payable to the designee who is the owner of the settlement.

Example of Claim Processing on Multiple Levels In a Hierarchy

Figure 5:
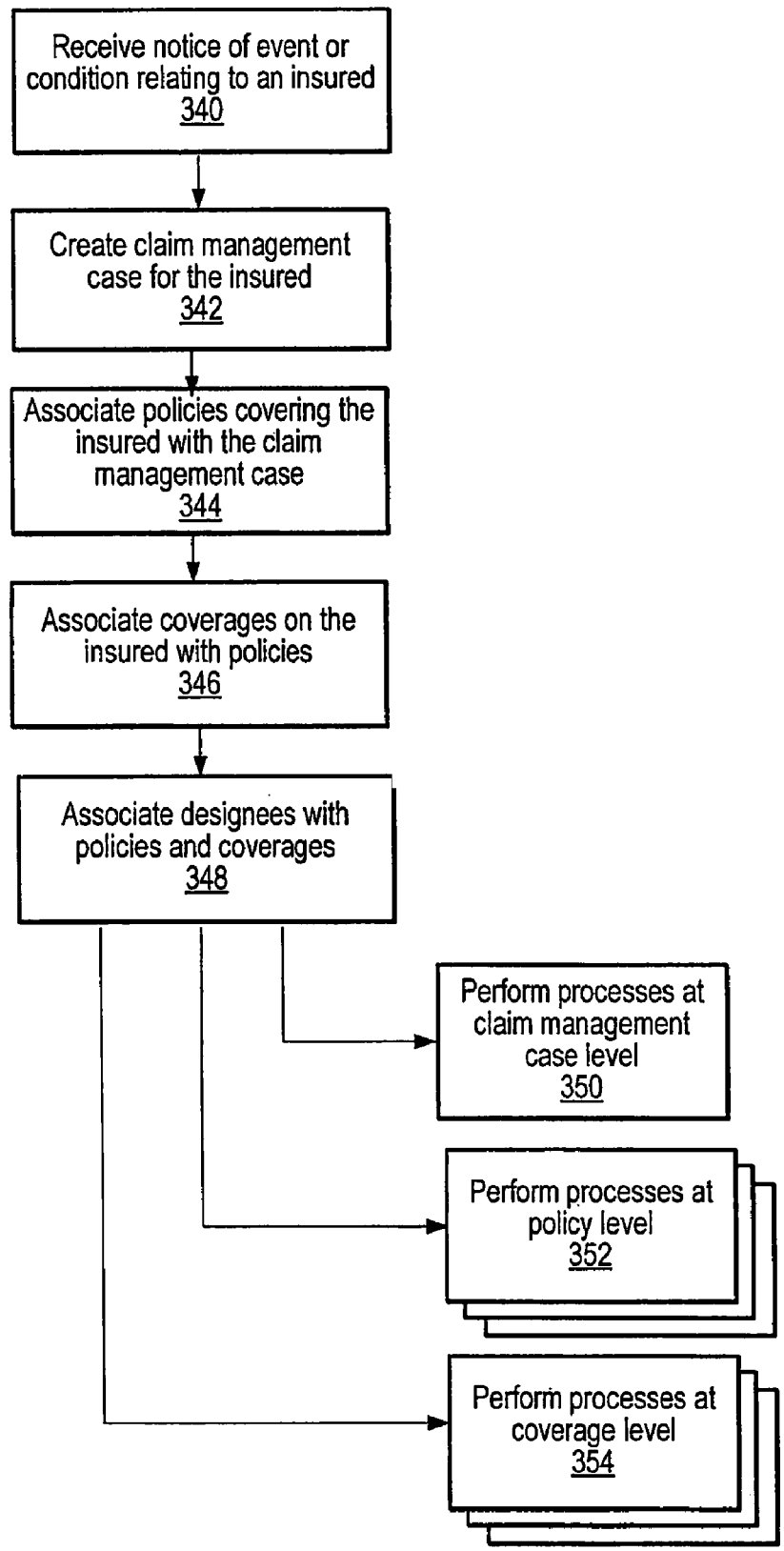
FIG. 5 illustrates claims processing of multiple policies covering an insured according to one embodiment.

FIG. 5 illustrates claims processing of multiple policies covering an insured according to one embodiment. At 340, notice is received an event or condition relating to an insured, such as the death of the insured. At 342, a claim management case is created for the insured. At 344, two or more policies covering the insured are associated with the claim management case. In some embodiments, all of the policies covering the insured with a particular carrier are associated with the insurance policy. At 346, any coverages (e.g., base coverages, riders) are associated with the insurance policies. At 348, designees (e.g., beneficiaries) are associated with the policies and coverages. At 350, claim processing is carried out on claim management case level for any data (e.g., information requirements) that apply to all of the associated policies. At 352, claims processing is carried out at a policy level on a policy-by-policy basis for any data that relates to the individual policies. The policy level processing may apply to any coverages associated with the policies. At 354, claims processing is carried out at a coverage level on a coverage-by-coverage basis for any data that relates to the individual coverages. A report may be provided to one or more of the designees. The report may cover all the insurance policies on the insured. In some embodiments, adjudication of any claim until a predetermined condition (e.g., fulfillment of information requirement such as a death certificate) is satisfied at the claim management case level.

In some embodiments, a premium on one or more insurance policies may be suspended upon fulfillment of an information requirement (e.g., receipt of a death certificate). In certain embodiments, processing may be suspended on one of the insurance policies covering the insured but not suspended other policies covering the insured. Such processing may be configurable using business rules.

In some embodiments, a determination may be made at the case level of whether a single payment can be issued to a designee for two or more of the insurance policies. For example, if an insured has two policies with the same carrier and payment is to be made under both policies to a particular beneficiary, then it may be that payment under both policies can be aggregated into a single check. If, however, the policies are covered by different subsidiaries of the carrier, then it may not be possible to handle payment of both claims with a single check. Such a payment arrangement may be configurable using business rules.

Example of a Claims Processing Workflow

Figure 6:
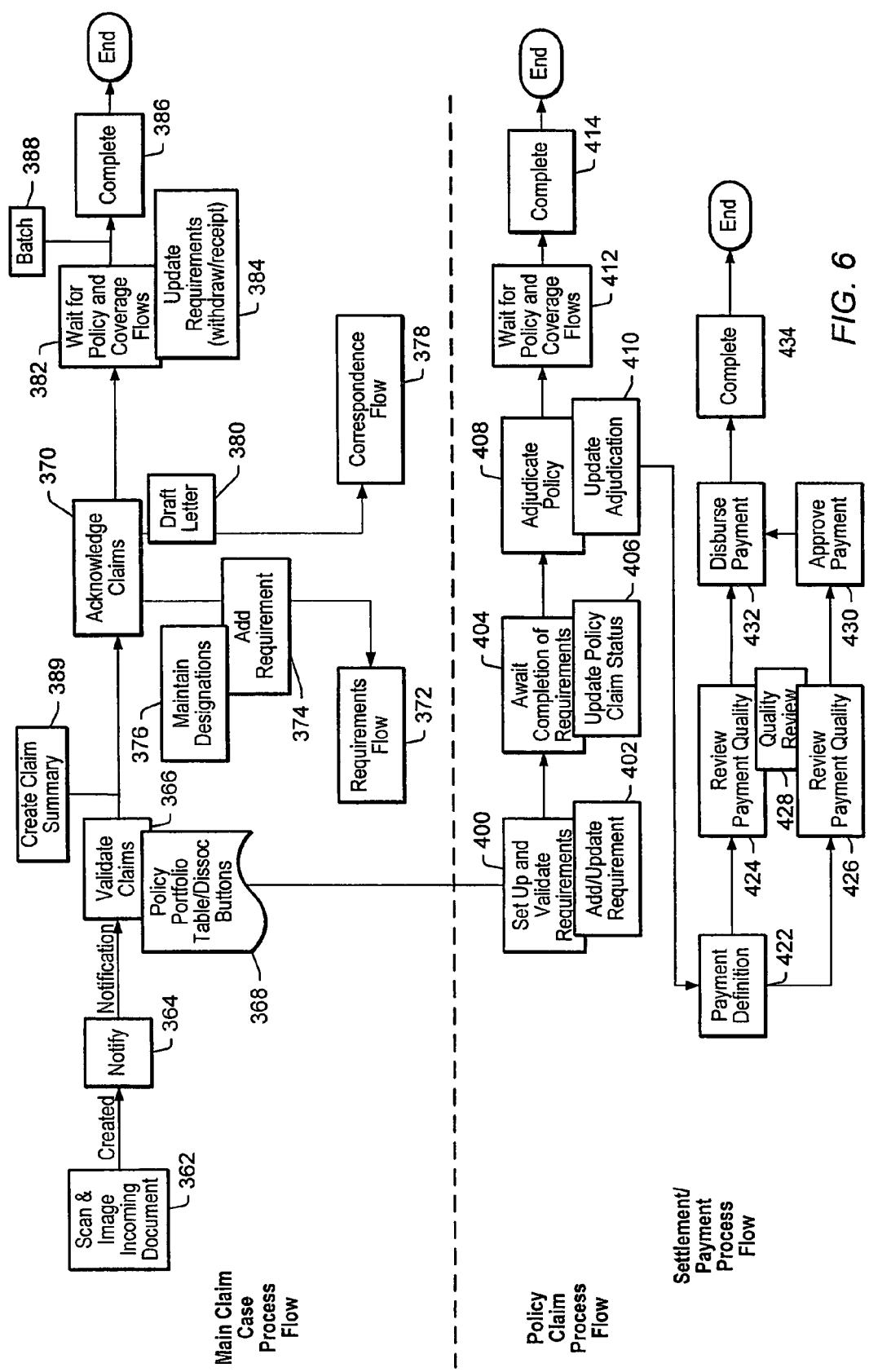
FIG. 6 illustrates processing of an insurance claim according to one embodiment.

FIG. 6 illustrates processing of an insurance claim according to one embodiment. A document imaging and workflow system may be used to pass documents, information or tasks from one participant to another for action, according to a set of procedural rules. The imaging and workflow system may capture inbound document information from multiple sources such as paper, fax, email, etc., and manage the information. Data may be stored in a central information repository. Work may be automatically distributed to appropriate associates or automated steps based on business rules and requirements. An integrated work management system may allow work to be routed to the appropriate claims processors and coordinates the process flow of the claim and all supporting documents.

At 362, a document relating to a claim may be received. For example, an insurance company may receive a letter from the executor of an insured to notify the insurance company of the insured's death. The received document may be scanned. An image of the scanned document may be created. The imaged document may be submitted into a workflow.

At 364, notification details may be captured. Examples of notification details include a client identifier, the insured's name and social security number, the name of the insurance carrier. A claim identifier (e.g., claim number) or may be assigned for the claim case. Other information, such as line of business, business area, work type may be established and stored for one or more claims. A claim notification may be the first user controlled process in a claims processing system. Claim Notification can be accessed either as a result of a call center claim notification or because a work item indicates that a Claim Notification needs to occur. The Claim Notification process may result in a Claim Case record being created and either an existing work item is then updated (e.g., back office) or created (e.g., call center).

The initial (first) notifier of claim is recorded as a party to the claim. Depending on the type claim, this person may also be a beneficiary (Death Claims), the insured (Accelerated Death Claims) or both (Waiver of Premium Claims). A notifier is added using the standard Search and Add Client dialogs. The Insured against whom a claim is being made is recorded as a party to the claim. Depending on the type of claim, this person may also be a beneficiary, the notifier, or both. An insured is added using the standard Search and Add Client dialogs. For a Death Claim the following information may be captured:

- Date of Death—refers to the date of loss when death occurred.
- Location—refers to the City, State, and Country where death occurred.
- Manner of Death—refers to how death occurred (e.g. Accident, Natural, Unknown).
- Special Circumstances—refers to if death was result of a recent disaster or war.
- Notifier Name—refers to person who notified the death occurred. This is view-only display of name captured during Take A Call.
- Notifier Association—refers to notifiers relationship to the claim or policy.
- Insured Relationship—refers to notifiers relationship to the insured.
- Search—opens the Customer Search dialog to add or search for any parties that maybe associated to the claim.
- Additional Parties—refers to table where any interested claim parties can be captured at notification. The parties may also display as interested parties within claims.

In some embodiments, a system automatically identifies all designees and other parties to a claim, and any special handling that may be needed for each claim. Users may be permitted to make manual adjustments for each claim situation.

In some embodiments, claims personnel can check the status of a claim and electronically access details of the claim, including correspondence and requirements documents. All types of notifications, including telephone calls, mail, fax and e-mails, may be archived while users may enter relevant claim details into the system.

At 366, validation of one or more claims may be performed. Each claim may be screened and validated or invalidated as appropriate. One or more policy files may be requested for the claim case. A claim management case may be created. In some embodiments, all policies covering a particular insured may be associated with the claim management case. The system may automatically establish a claim number and assign a case to one or more examiners. Policy work items and coverage work items may be generated and managed. In some embodiments, the policy work items and coverage work items may be placed in a policy requirement queue.

A claim management case may be used to support processing of multiple policies under the same umbrella. These policies may be associated to the claim management case through a Claim Policy Portfolio. A claim management case may reduce redundancy by allowing claim processors, examiners and other persons to enter, review, and maintain information relating to an insured in one place.

A claim hierarchy may be created by associating policies with the claim management case. Once associated, a policy structure is copied to the claim and is used to drive claim processing from that point, including Requirements generation, update and tracking, Letters, Adjudication, and Payments.

Claim designations may be made. Specific parties may be associated with the relevant elements of the claim hierarchy. The claim hierarchy represents all of the policies, coverages, benefits for the claim associated to the claim—and then links the designees with a legal right to the proceeds of the claim for each policy element. Examples of designees include:

- Beneficiaries—This grouping includes a number of different types of beneficiary, for example: primary, contingent
- Collateral Assignee—A Collateral Assignee has a legal right to some or all of the proceeds of a policy.
- Fixed Assignee—A Fixed Assignee has a legal right to some or all of the proceeds belonging to another Designee.

Business rules may be applied to establish workflow and assignments to distribute workloads. Claims may be matched to the examiners that are best suited for each claim situation.

At 389, the claim system may provide a summary view of the claims details to aid in the processing of a claim. The claim summary may provide a view of all pertinent loss details, dates, and statuses providing the claims examiner quick reference claim review and update capability.

A Claim Portfolio view may provide basic claim information. This view may list all the claims for the insured, regardless of type.

Various reports may be generated for work management, such as cycle time and productivity, and claims information, such as claim amount, age and product type.

At 368, policies may be displayed in a policy portfolio table. In some embodiments, a policy portfolio table is used for associating and dissociating policies with a claim case. FIG. 7 illustrates a policy portfolio view according to one embodiment. A policy portfolio view may allow the display and maintenance of policy data associated with the claim management case. Policies may be brought in to the display by performing a search against the policy administrative host system. Policy data may also be "built" by utilizing the manual add functionality. Examples of functions available from a policy portfolio view include:

- Associate—attaches the policy to the claim management case
- Dissociate—removes the policy from the claim management case (but policy data display may remain in the table for reference)
- Add Manual Policy—invokes policy Tab views with fields enabled for input so that policy data may be entered manually
- Search—invokes a policy search dialog—can search host system by number, name, date of birth, or government ID Examples of information included in a policy view include:

- Product—type of insurance plan (interest sensitive life, universal life, whole life, etc.)
- Policy Number
- Status
- Role
- Source—host system on which policy resides
- Updated—date on which policy was last maintained.

Referring again to FIG. 6, at 370, acknowledgment of one or more claims may be performed. Each claim for the claim case may be assigned to a claim examiner. Policy files may be reviewed. Additional policy detail may be entered at this time. Initial requirements (e.g., information requirements) may be established across all levels (claim, policy, policy coverage, designee). Requirements may be established automatically, by manual entry, or a combination of both.

At 372, claim requirement work items may be generated and managed. The work items may be placed in a requirements queue. At 374, requirements may be added. In some embodiments, work items may be generated and queued upon selection of a Generate push button on a Requirements Tab in a graphical user interface. At 376, beneficiaries may be entered and may available for designation. Designations may be maintained in a designations tab.

At 378, claim correspondence work items may be generated. The correspondence work items may be placed in a correspondence queue. In some embodiments, the work items may be generated and queued upon selection of a Generate push button on a Correspondence Tab in a graphical user interface. At 380, letters that apply at the claim case level may be drafted.

At 382, the system may wait until all claim policy and claim coverage flows associated with the claim case reach a predetermined state. For example, the system may wait until all claim policy and claim coverage flows reach a "Paid" status. At 384, requirements may be updated as appropriate during while the processing of the policy and coverage work items is occurring. Upon all claim policy and claim coverage flows reaching the predetermined state (e.g., "Paid" status), the work item activity for the claim case may be completed at 386. The claim status may be set to closed. Processing of claims may be by a batch process, as indicated at 388.

Beginning at 400, a processing of a specific insurance policy is illustrated. The processing of a specific coverage within an insurance policy may be similar. At 400, requirements pertaining to all policy this policy/coverage are set up and validated. At 402, work items may be generated and placed in a queue. At 404, the system may wait for all requirements to be fulfilled. In some embodiments, the system may wait for a rendezvous to occur. In a rendezvous, an item in the queue may wait for a response an external source, such as a policy administration system. During a rendezvous, a queued item waiting for a response from an external source may receive the response data. The response data may be compared to expected data. If the response data matches the expected data, the rendezvous is effective. At 406, policy claim status may be updated.

At 408, a claim on the policy may be adjudicated. Adjudication may include evaluating a life claim in order to determine the policy and or coverage proceeds available to be settled and paid for any and all designated beneficiaries and or assignees; as well as any associated payees. A review of all claims related information may be accomplished, including comments, notification information, imaged sources, entity designations, requirements resolution, and correspondence. If a benefit can be paid to at least one beneficiary, assignee, and or collateral assignee, then the claim proceeds settlement, payment, authorization, and disbursement processes may be initiated when adjudication is complete. Adjudication may be updated at 410. Adjudication may include:

Verifying the gross benefit (before proceeds) payable utilizing a death benefit quote. Gross benefit payable includes all base policy coverage amounts and applicable rider coverage amounts.

Approving the net benefits that are ready to be paid; ready to be paid includes the base policy coverage amount, the rider coverage amount which may or may not apply to the base policy coverage amount, any increased coverage amount applicable to the base policy coverage amount, and any necessary benefit adjustments.

Confirming all entity designation associations—beneficiary, assignee, payee.

Verifying the accuracy of the calculated premium amount due or premium refund amount owed (if applicable). A business rule will be created in order to determine who receives the return of premium, premium due, and or any outstanding loan payments if the owner or payer of the policy is different from the insured.

The calculated premium amount due or owed is a policy administration system determined value and can be manually overridden if necessary.

Confirming policy premium monies due and or owed do not reside in suspense.

The application of all monies in suspense due and or owed is the responsibility of policyholder services.

Adjusting the benefit amount as necessary

Deriving the adjudicated policy benefit proceeds available for initiation of the settlement, payment, authorization and disbursement processes.

Other processes include checking reinsurance, validating designations, validating/defining payees, adding adjustments, and releasing proceeds for designee (or designees) for each policy/coverage for settlement and payment.

At 412, the system awaits all claim policy and claim coverage flows to reach "Paid". At 414, work item activity is completed. In cases where a policy is dissociated from the claim, then the work item will go to the completed queue because there is no further work required for the policy within claims.

Beginning at 422, a processing of a settlement for a specific insurance policy is illustrated. At 422, a work item may be created for a payment definition. The work item will be in a queue and the Settlement and all subordinate Payments will have a status of Pending Submission. Payment processing may not commence until proceeds have been approved for payment through adjudication. Adjudication will result in a Settlement being created. A settlement may include a single designees proceeds from a whole policy, a selection of coverage items on a policy, or a single coverage item. The amount of the settlement will be the sum of the claim amount items on the coverage item(s) in the settlement. The settlement may be initialized with a single default payment for amount of the settlement proceeds, payable to the designee who is the owner of the settlement.

Once all payment definitions have been completed under a settlement, the payment request can be made. At 424 and 426, payment quality may be reviewed as part of quality review at 428. Each Payment Definition may be required to pass quality approval if selected by the quality algorithm. If quality has been passed the work item move to either a Pending Disbursement will be the queue and the Settlement and all subordinate Payments will still have a status of Pending Review. At 430, payments of meeting certain business criteria must also be approved. These payments may be selected by a business rule. At 432, payment may be disbursed. Calculations may be automatically made for interest, payment adjustments, or other amounts. In some embodiments, a system may automatically trigger a disbursement. At 434, the status of payment is Complete.

Figure 8:
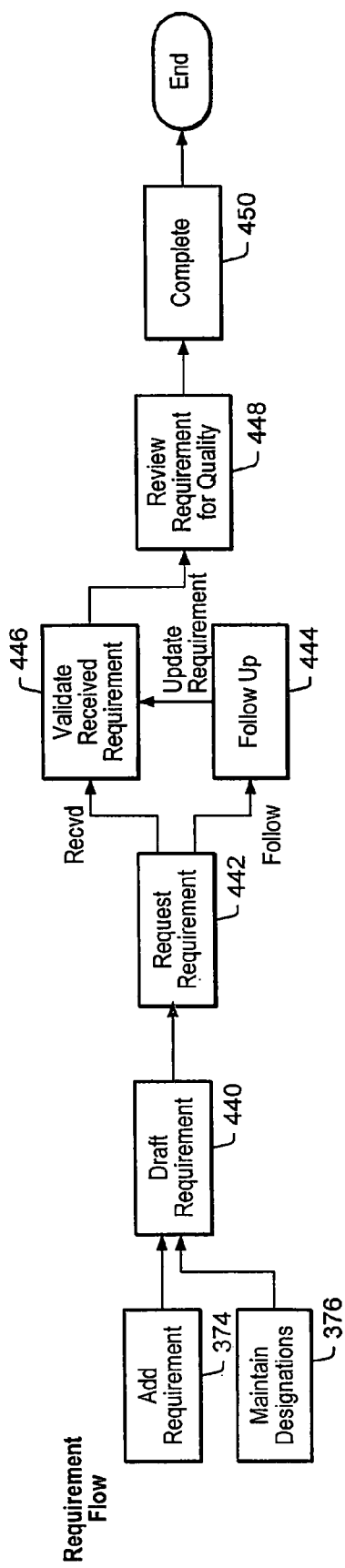
FIG. 8 illustrates requirements flow according to one embodiment.

FIG. 8 illustrates requirements flow according to one embodiment. In order to pay/process a claim, claim requirements must be established and resolved. Claim requirements may be resolved either by receipting and validating, or by waiving. At 440, claim requirements may be drafted. Claim requirement may be established at a claim level, policy level, coverage level, and/or beneficiary level. The initial requirements determination may be automated, using business rules, according to the specifics of the claim. If there are multiple beneficiaries or policies on a claim, a claim level requirement may be requested on the correspondence to all beneficiaries (even though one is sufficient to satisfy the requirement for all beneficiaries). As an example, a certified copy of the death certificate is a claim level requirement that is a requirement listed on each beneficiary letter. Requirements can be added or resolved (received or waived) any time prior to payment of the claim.

Examples of Requirements Include
Claim Level—certified copy of a death certificate
Policy Level—original policy or loss of policy form, state specific requirements
Coverage Level—Police Report (for accidental death benefit riders)
Beneficiary Level—Claimants Statement Requirements may be displayed per beneficiary or at a claim, policy, or coverage level. A Requirements dialog may support, for example, the following functionality:

Generation of requirements by accessing a business rule
Add of a requirement
Update of a requirement
Deletion of a requirement At 442, the system may wait for a requirement (e.g., the document that is required for fulfillment) to be received. At 446, the requirement may be received. Once the requirement is received from a/one beneficiary and marked received, the requirement may be resolved across the board for all beneficiaries for the claim.

If the requirement is not received within a prescribed time period, a follow up process may be carried out at 444. A follow-up date for the requirement is established using business rules. The follow-up date can be manually overridden to provide for more time and or prevent follow-up.

A record may be made of the date a requirement is requested and the date a requirement is resolved which includes a resolution reason. There is the possibility that a requirement is received, but is not in good order. The not in good order requirement status indicates something was received, but was not sufficient to satisfy the requirement e.g., a copy of the death certificate was received, but it was not a certified copy.

At 448, the requirement may be reviewed for quality. At 450, the requirement may be completed. Upon the resolution of the last requirement for a beneficiary, a notification (message/indicator) may be generated to a claims processor indicating that all requirements for a beneficiary are resolved and the claim is ready for adjudication.

Figure 9:
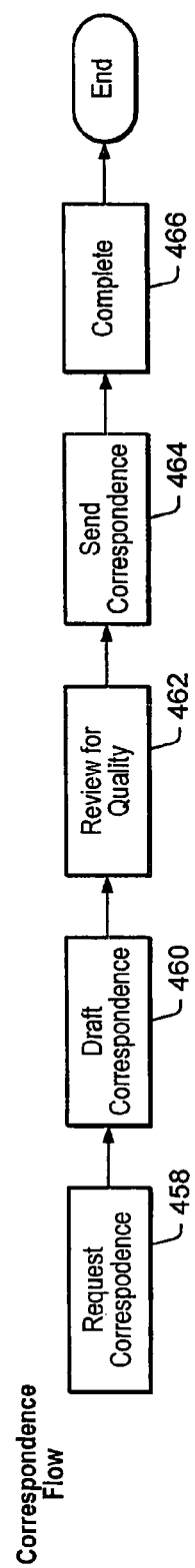
FIG. 9 illustrates correspondence flow according to one embodiment.

FIG. 9 illustrates correspondence flow according to one embodiment. At 458, a request for correspondence may be made. Examples of correspondence include initial correspondence, on-demand correspondence, follow-up correspondence, correspondence resulting from changing claim data, and correspondence that needs to be resent. In some embodiments, correspondence may be generated by a document management system upon request from the system. Correspondence may be generated by invoking a business rule. Correspondence can be manually added or updated anytime during the claim lifecycle.

At 460, correspondence may be drafted. All requirements to be included in the correspondence may be identified. At 462, the correspondence may be reviewed for quality. After quality review, the correspondence may be approved for outbound send. At 464, the correspondence may be printed and mailed. At 466, the correspondence flow is complete.

A multi-level workflow (for example, such as described relative to FIGS. 6-9 above) may be conducted based on any of various hierarchies. For example, claim management case level processing may apply to all policies covering a specific insured, with separate coordinated workflows at a policy level, coverage level, a designee level, and a benefit level. As another example, claim management case level processing may apply to all claims relating to a specific designee, with other processing workflows occurring in coordination with the claim management case workflow relating to the designee. As still another example, claim management case level processing may apply to all claims relating to a specific benefit, with other processing workflows occurring in coordination with the claim management case workflow relating to the benefit.

Although the description above gave an example in which the system waited until policy and coverage flows reached a "Paid" status (i.e., with respect to 382), in other embodiments, many other states or triggers, based any or all of the process flows, may be used to coordinate processing among the different workflows. For example, workflow on one or more designated policies may be suspended until a particular information requirement on a particular policy is met. Moreover, different conditions may apply for different workflows. For example, payment may be allowed to proceed for one policy or one beneficiary, but not for another policy or beneficiary. Such exceptions may be implemented, for example, through application of business rules.

In some embodiments, a workflow for processing of one type of policy for an insured or designee may be coordinated with a workflow for processing of another type of policy for another type of policy for the insured or designee. For example, fulfillment of receiving a death certificate in processing of a life insurance policy on an insured may result in suspension of payments on a disability policy for that insured. Business rules may be used to define workflow.

In some embodiments, a claims process may include synchronization of data within different elements of the system and/or different workflows. For example, data relating to an information requirement may be synchronized between one policy administration system and another policy administration system. As another example, data may be synchronized between workflow at a coverage level and workflow at a policy level. As yet another example, data may be synchronized between two different policies.

Example Of Processing Of Information Requirements At Multiple Levels

Figure 10:
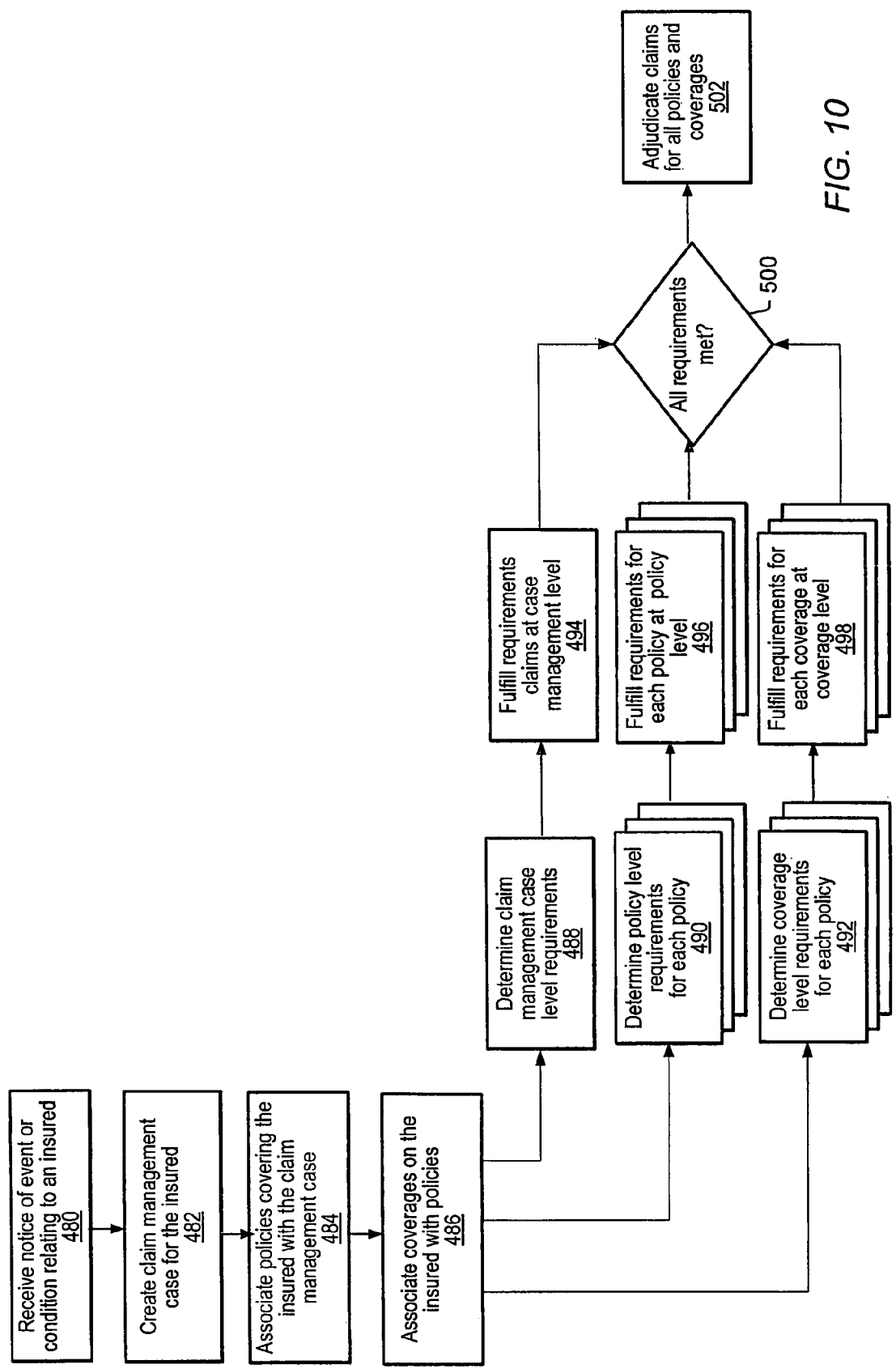
FIG. 10 illustrates a method of fulfilling requirements for claims according to one embodiment.

FIG. 10 illustrates a method of fulfilling requirements for claims according to one embodiment. At 480, notice is received an event or condition relating to an insured, such as the death of the insured. At 482, a claim management case is created for the insured. At 484, two or more policies covering the insured are associated with the claim management case. In some embodiments, all of the policies covering the insured with a particular carrier are associated with the insurance policy. At 486, any coverages (e.g., base coverages, riders) are associated with the insurance policies. At 488, 490, and 492, information requirements are determined at the claim management case level, policy level, and coverage level, respectively. At 494, 496, and 498, information requirements are fulfilled at the claim management case level, policy level, and coverage level, respectively. In 500, a determination is made whether all the information requirements at all levels (e.g., for all policies and coverages) has been met. If all the information requirements at all levels have been met, then claims for all the policies are adjudicated at 502.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of processing insurance claims relating to an insured, comprising:
    a computer system receiving at least one notice of an event or condition that gives rise to a claim for payment under a first insurance policy covering the insured;
    creating a node hierarchy, wherein creating the node hierarchy comprises:
        the computer system creating a claim management case node relating to the insured at a claim management case level;
        the computer system creating one or more policy nodes at a policy level separate from and below the claim management case level, each of at least one of the policy nodes corresponding to an insurance policy covering the insured;
        the computer system creating one or more coverage nodes at a coverage level separate from and below the policy level, each of at least one of the coverage nodes corresponding to an insurance base coverage or a rider under one of the insurance policies covering the insured;
    the computer system attaching at least one of the coverage nodes at the coverage level to the at least one of the policy nodes at the policy level;
    the computer system creating two or more benefit nodes at a benefit level, each of at least two of the benefit nodes corresponding to a benefit under at least one of the insurance policies associated with the claim management case or corresponding to a benefit under at least one of the insurance base coverages or riders associated with one of the insurance policies; and
    the computer system attaching at least a first one of the benefit nodes to at least one of the policy nodes of the policy level and attaching at least a second one of the benefit nodes to at least one of the coverage node of the coverage level, wherein the level of the node to which each of the first one of the benefit nodes and the second one of the benefit nodes is attached depends on whether the benefit corresponding to the benefit node pertains to a policy as a whole or pertains to a particular base coverage or a rider under one of the policies;
    the computer system performing, at a claim management case level, using the claim management case node, at least one process for the claim management case, wherein the at least one process performed at the claim management case level applies to all of the policies and all of the coverages associated with the claim management case;
    the computer system performing, at the policy level or the coverage level, using at least one of the policy nodes or one of the coverage nodes, at least one process for the claim management case, wherein the at least one process performed at the policy level or at the coverage level applies to only one of the policies associated with the claim management case or to only one of the coverages associated with the claim management case;
    the computer system performing, at the benefit level, using at least one of the benefit nodes, at least one process for the claim management case, wherein the at least one process performed at the benefit level applies to only one of the benefits associated with the claim management case;
    the computer system performing at least one rendezvous, wherein at least one rendezvous comprises:
    a queued item waiting for a response from a policy administration system;
    the queued item receiving response data from the policy administration system;
    the computer system comparing the response data from the policy administration system to expected data; and
    the computer system determining that a rendezvous is effective based on a match of the response data and the expected data; and
    adjudicating at least one claim under one or more of the policies.

2. The method of claim 1, wherein the one or more policy nodes comprises two or more policy nodes, each of the policy nodes relating to an insurance policy covering the insured, wherein two or more insurance policies covering the insured are associated with the claim management case, wherein the at least one process performed at the claim management case level applies to at least two insurance policies covering the life or health of the insured.

3. The method of claim 2, wherein the at least one process performed at the claim management case level applies to all the insurance policies covering the life or health of the insured carried by a particular carrier.

4. The method of claim 1, wherein creating the hierarchy comprises creating at least one claim management case object, one or more insurance policy objects, and one or more coverage objects.

5. The method of claim 1, further comprising inhibiting adjudication of any of the insurance policies covering the insured in the claim management case until one or more predetermined requirements are satisfied for the claim management case.

6. The method of claim 1, further comprising suspending activity for the claim management case at the policy level until one or more predetermined conditions are satisfied at the claim management case level.

7. A system, comprising:
 a processor;
 a memory coupled to the processor and configured to store program instructions executable by the processor to perform:
 receiving at least one notice of an event or condition that gives rise to a claim for payment under a first insurance policy covering the life or health of an insured;
 creating a node hierarchy, wherein creating the node hierarchy comprises:
 creating a claim management case node relating to the insured at a claim management case level; and
 creating one or more policy nodes at a policy level separate from and below the claim management case level, each of at least one of the policy nodes corresponding to an insurance policy covering the insured;
 creating one or more coverage nodes at a coverage level separate from and below the policy level, each of at least one of the coverage nodes corresponding to an insurance base coverage or a rider under one of the insurance policies covering the insured;
 attaching at least one of the coverage nodes at the coverage level to the at least one of the policy nodes at the policy level;
 creating two or more benefit nodes at a benefit level, each of at least two of the benefit nodes corresponding to a benefit under at least one of the insurance policies associated with the claim management case or corresponding to a benefit under at least one of the insurance base coverages or riders associated with one of the insurance policies; and
 attaching at least a first one of the benefit nodes to at least one of the policy nodes of the policy level and attaching at least a second one of the benefit nodes to at least one of the coverage nodes of the coverage level, wherein the level of the node to which each of the first one of the benefit nodes and the second one of the benefit nodes is attached depends on whether the benefit corresponding to the benefit node pertains to a policy as a whole or pertains to a particular base coverage or a rider under one of the policies;
 performing, at a claim management case level, using the claim management case node, at least one process for the claim management case, wherein the at least one process performed at the claim management case level applies to all of the policies and all of the coverages associated with the claim management case;
 performing, at the policy level or the coverage level, using at least one of the policy nodes or one of the coverage nodes, at least one process for the claim management case, wherein the at least one process performed at the policy level or at the coverage level applies to only one of the policies associated with the claim management case or to only one of the coverages associated with the claim management case; and
 performing, at the benefit level, using at least one of the benefit nodes, at least one process for the claim management case, wherein the at least one process performed at the benefit level applies to only one of the benefits associated with the claim management case;
 the computer system performing at least one rendezvous, wherein at least one rendezvous comprises:
 a queued item waiting for a response from a policy administration system;
 the queued item receiving response data from the policy administration system;
 the computer system comparing the response data from the policy administration system to expected data; and
 the computer system determining that a rendezvous is effective based on a match of the response data and the expected data; and
 adjudicating at least one claim under one or more of the policies.

8. A tangible, computer readable storage medium comprising program instructions stored thereon, wherein the program instructions are computer-executable to perform:
 receiving at least one notice of an event or condition that gives rise to a claim for payment under a first insurance policy covering the life or health of the insured;
 creating a node hierarchy, wherein creating the node hierarchy comprises:
 creating a claim management case node relating to the insured at a claim management case level; and
 creating one or more policy nodes at a policy level separate from and below the claim management case level, each of at least one of the policy nodes corresponding to an insurance policy covering the insured;
 creating one or more coverage nodes at a coverage level separate from and below the policy level, each of at least one of the coverage nodes corresponding to an insurance base coverage or a rider under one of the insurance policies covering the insured;
 attaching at least one of the coverage nodes at the coverage level to the at least one of the policy nodes at the policy level;
 creating two or more benefit nodes at a benefit level, each of at least two of the benefit nodes corresponding to a benefit under at least one of the insurance policies associated with the claim management case or corresponding to a benefit under at least one of the insurance base coverages or riders associated with one of the insurance policies; and
 attaching at least a first one of the benefit nodes to at least one of the policy nodes of the policy level and attaching at least a second one of the benefit nodes to at least one of the coverage nodes of the coverage level, wherein the level of the node to which each of the first one of the benefit nodes and the second one of the benefit nodes is attached depends on whether the benefit corresponding to the benefit node pertains to a policy as a whole or pertains to a particular base coverage or a rider under one of the policies; and
 performing, at a claim management case level, using the claim management case node, at least one process for the claim management case, wherein the at least one process performed at the claim management case level applies to all of the policies and all of the coverages associated with the claim management case;

performing, at the policy level or the coverage level, at least one process for the claim management case, wherein the at least one process performed at the policy level or at the coverage level applies to only one of the policies associated with the claim management case or to only one of the coverages associated with the claim management case; and performing, at the benefit level, using at least one of the benefit nodes, at least one process for the claim management case, wherein the at least one process performed at the benefit level applies to only one of the benefits associated with the claim management case;

the computer system performing at least one rendezvous, wherein at least one rendezvous comprises:

a queued item waiting for a response from a policy administration system;

the queued item receiving response data from the policy administration system;

the computer system comparing the response data from the policy administration system to expected data; and the computer system determining that a rendezvous is effective based on a match of the response data and the expected data; and adjudicating at least one claim under one or more of the policies.

9. The method of claim 1, further comprising:

the computer system creating two or more designee nodes at a designee level, each of at least one of the designee nodes corresponding to a designee under at least one of the insurance policies associated with the claim management case or corresponding to a designee under at least one of the coverages associated with one of the insurance policies; and the computer system associating at least a first one of the designee nodes with at least one of the policy nodes of the policy level and associating at least a second one of the designee nodes with at least one of the coverage nodes of the coverage level.

10. The method of claim 9, further comprising, for at least one policy node or the coverage node associated with at least one of the benefit nodes and at least one of the designee nodes:

attaching one or more requirements to the policy node or the coverage node;

attaching one or more requirements to the at least one benefit node associated with the policy node or the coverage node; and attaching one or more requirements to the at least one designee node associated with the policy node or the coverage node, wherein the computer system performing, at a policy level or coverage level, at least one process for the claim management case comprises:

the computer system performing at least one process at a policy level or a coverage level to satisfy at least one of the one or more requirements attached to the policy or coverage node;

the computer system performing at least one process at a benefit level to satisfy at least one of the one or more requirements attached to the at least one benefit node; and the computer system performing at least one process at a designee level to satisfy at least one of the one or more requirements attached to the at least one designee node.

11. The method of claim 1, wherein the computer system performing, at a claim management case level, at least one process for the claim management case comprises:

the computer system performing, at a claim management case level, at least one process to fulfill an information requirement for adjudicating the insurance policies, wherein the information requirement applies to at least two of the insurance policies associated with the claim management case, wherein the computer system performing, at a policy level or coverage level, at least one process for the claim management case comprises:

the computer system performing, at a policy level, one or more processes to fulfill an information requirement for adjudicating an insurance policy associated with the claim management case, wherein the at least one of the one or more processes performed at the policy level applies to only one of the insurance policies associated with the claim management case; and the computer system performing, at a coverage level, one or more processes to fulfill an information requirement for a coverage associated with the claim management case, wherein the at least one of the one or more processes performed at the coverage level applies to only one of the insurance coverages associated with one of the insurance policies;

the method further comprising:

the computer system determining whether predetermined information requirements for the claim management case have been met at the case management level, the policy level, and the coverage level;

the computer system inhibiting adjudication of any the insurance policies in the claim management case or adjudication of any of the insurance coverages in the claim management case until the predetermined information requirements for the claim management case are satisfied at the case management level, the policy level, and the coverage level; and adjudicating claims under the one or more of the insurance policies covering the insured.

12. The method of claim 1, wherein at least one of the coverage nodes created at the coverage level corresponds to a policy rider for one of the insurance policies covering the insured, the method further comprising attaching one or more information requirements to the at least one coverage node corresponding to the policy rider, wherein the computer system performing, at a policy level or coverage level, at least one process for the claim management case comprises:

the computer system performing at least one process at a coverage level to satisfy, at a coverage level, at least one information requirement for the policy rider.

13. The method of claim 1, wherein at least one of the coverage nodes created at the coverage level corresponds to a policy rider for one of the insurance policies covering the insured, the method further comprising attaching one or more information requirements to the at least one coverage node corresponding to the policy rider, wherein the computer system performing, at a policy level or coverage level, at least one process for the claim management case comprises:

the computer system performing at least one process at a policy level to satisfy at least one information requirement attached to a policy node; and the computer system performing at least one process at a coverage level to satisfy, at a coverage level, at least one information requirement for the policy rider.

14. The method of claim 1, wherein the first one of the benefit nodes associated with the at least one of the policy nodes and the second one of the benefit nodes associated with the at least one of the coverage nodes are each associated with the most general node to which the data for the benefit node applies.

15. The method of claim 9, wherein at least the first one of the benefit nodes and the first one of the designee nodes are both associated with the same one of the policy nodes, and wherein at least the second one of the benefit nodes and the second one of the designee nodes are both associated with the same one of the coverage nodes.

16. The method of claim 1, wherein the node hierarchy comprises two or more procedures and two or more data structures in a service-oriented architecture.

* * * * *